US012047789B2

(12) United States Patent
Huang et al.

(10) Patent No.: US 12,047,789 B2
(45) Date of Patent: Jul. 23, 2024

(54) BEAMFORMING DETERMINATION FOR IAB SYSTEM WITH FULL DUPLEX

(71) Applicant: Qualcomm Incorporated, San Diego, CA (US)

(72) Inventors: Min Huang, Beijing (CN); Chao Wei, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/628,137

(22) PCT Filed: Jul. 18, 2019

(86) PCT No.: PCT/CN2019/096481
§ 371 (c)(1),
(2) Date: Jan. 18, 2022

(87) PCT Pub. No.: WO2021/007833
PCT Pub. Date: Jan. 21, 2021

(65) Prior Publication Data
US 2022/0264321 A1    Aug. 18, 2022

(51) Int. Cl.
*H04W 16/28* (2009.01)
*H04L 5/14* (2006.01)
(Continued)

(52) U.S. Cl.
CPC .............. *H04W 16/28* (2013.01); *H04L 5/14* (2013.01); *H04W 56/001* (2013.01); *H04W 72/23* (2023.01); *H04W 88/14* (2013.01)

(58) Field of Classification Search
CPC ... H04W 16/28; H04W 56/001; H04W 72/23; H04W 88/14; H04W 84/047;
(Continued)

(56) References Cited

U.S. PATENT DOCUMENTS 9,641,306 B2    5/2017  Seo et al.
10,375,707 B2   8/2019  Hampel et al.
(Continued)

FOREIGN PATENT DOCUMENTS

CN    109151888 A    1/2019
CN    109565852      4/2019
(Continued)

OTHER PUBLICATIONS

International Search Report and Written Opinion—PCT/CN2019/096481—ISA/EPO—Apr. 17, 2020.
(Continued)

*Primary Examiner* — Kyaw Z Soe
(74) *Attorney, Agent, or Firm* — Holland & Hart LLP

(57) ABSTRACT

Methods, systems, and devices for wireless communications are described. A relay node may determine a channel status for each of a plurality of downlink beamforming directions between a parent node and the relay node based at least in part on a downlink beamforming direction between the relay node and a child node. The relay node may transmit a report to the parent node indicating at least a subset of the channel statuses and an indication that a respective downlink beamforming direction of the plurality of downlink beamforming directions corresponds to a respective channel status in the subset of the channel statuses. The relay node may receive a grant from the parent node indicating a first downlink beamforming direction. The relay node may monitor for a downlink transmission from the parent node based at least in part on the grant and the first downlink beamforming direction.

70 Claims, 16 Drawing Sheets

(51) Int. Cl.
   *H04W 56/00* (2009.01)
   *H04W 72/23* (2023.01)
   *H04W 88/14* (2009.01)
(58) Field of Classification Search
   CPC ...... H04W 72/046; H04L 5/14; H04B 7/0634; H04B 7/0632; H04B 7/0695; H04B 7/15542
   See application file for complete search history.

(56) References Cited

U.S. PATENT DOCUMENTS

| | | | |
|---|---|---|---|
| 2010/0238845 | A1 | 9/2010 | Love et al. |
| 2011/0007685 | A1 | 1/2011 | Ma et al. |
| 2012/0170619 | A1 | 7/2012 | Chang et al. |
| 2016/0100347 | A1 | 4/2016 | Ryu et al. |
| 2018/0083679 | A1 | 3/2018 | Lim et al. |
| 2019/0199422 | A1 | 6/2019 | Li et al. |
| 2019/0364449 | A1* | 11/2019 | Yang ............ H04W 72/04 |
| 2021/0028832 | A1* | 1/2021 | Liu ............. H04B 7/0617 |

FOREIGN PATENT DOCUMENTS

| | | |
|---|---|---|
| WO | WO-2018026466 | 2/2018 |
| WO | WO-2020232098 A1 | 11/2020 |

OTHER PUBLICATIONS

Nokia, et al., "Resource Allocation and Coordination for IAB", 3GPP TSG RAN WG2 Meeting #104, 3GPP Draft, R2-1817617_IAB_Resource Allocation_V3, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 1, 2018, XP051481516, 7 pages, Retrieved from the Internet: URL:http://www.3gpp.org/ftp/tsg%5Fran/WG2%5FRL2/TSGR2%5F104/Docs/R2%2D1817617%2Ezip http://www.3gpp.org/ftp/tsg%9Fran/WG2%5FRL2/TSGR2%5F104/Docs/R2%2D1817617%2Ezip [retrieved on Nov. 1, 2018] , the Whole Document.

Nokia, et al., "Resource Allocation/Coordination Between Parent BH and Child links", 3GPP TSG RAN WG1 Meeting #95, R1-1812702, 3RD Generation Partnership Project (3GPP), Mobile Competence Centre, 650, Route Des Lucioles, F-06921, Sophia-Antipolis Cedex, France, Nov. 12, 2018-Nov. 16, 2018, Nov. 3, 2018 (Nov. 3, 2018), 11 Pages, the whole document, Retrieved from the Internet URL: http://www.3gpp.org/ftp/tsg%5Fran/WG1%5FRL1/TSGR1%5F95/Docs/R1%2D1812702%2Ezip pp. 3-4. 2.2. IAB resource types p. 5. 2.3 Resource pool coordination.

Qualcomm Incorporated: "Overview of IAB co-existence study for definition of RF requirements: Simulation methodology and assumptions", 3GPP TSG-RAN WG4 #90bis, R4-1904322, Xi'An, China, Apr.8, 2019-Apr. 12, 2019, Apr. 1, 2019 (Apr. 1, 2019), 5 Pages, the whole document.

AT&T: "Enhancements to Support NR Backhaul Links", 3GPP TSG RAN WG1 Meeting #94bis, R1-1810690, 3rd Generation Partnership Project, Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018, XP051518094, 15 pages, Chapter 2.3 "Frame Structure Design and Backhaul Multiplexing", Section 2.4.

Supplementary European Search Report—EP19937450—Search Authority—Munich—Feb. 28, 2023.

* cited by examiner

BEAMFORMING DETERMINATION FOR IAB SYSTEM WITH FULL DUPLEX

CROSS REFERENCE

The present Application is a 371 national stage filing of International PCT Application No. PCT/CN2019/096481 by Huang et al., entitled "BEAMFORMING DETERMINATION FOR IAB SYSTEM WITH FULL DUPLEX," filed Jul. 18, 2019, which is assigned to the assignee hereof, and which is expressly incorporated by reference in its entirety herein.

BACKGROUND

The following relates generally to wireless communications, and more specifically to beamforming determination for integrated access and backhaul (IAB) system with full duplex.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in mmW frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Some wireless communications systems may support both access and backhaul wireless communications. For example, such wireless communication systems may include nodes, which may also be referred to as anchor nodes, parent nodes, relay nodes, or child nodes depending on where the node is within the network, that facilitate wireless communication between a UE and the network. In some cases, a donor node (or anchor node) may have a high-capacity, wired, backhaul connection (e.g., fiber) to the network, while communicating simultaneously with one or more downstream relay nodes (e.g., downstream parent, relay, and/or child nodes) or UEs. A network that supports communications between a relay node and a UE may be referred to as an access network or link, while a network that supports communications between one or more relay nodes may be referred to as a backhaul network or link. In deployments supporting both access and backhaul, the network may be or implement an IAB network. Conventional beamforming techniques in IAB systems are deficient.

SUMMARY

The described techniques relate to improved methods, systems, devices, and apparatuses that support beamforming determination for integrated access and backhaul (IAB) system with full duplex. Generally, the described techniques provide for various techniques to support beamform direction selection, for downlink and uplink, in an IAB network that is configured or otherwise supports both non-full duplex and full duplex communications. In the downlink, this may include a relay node identifying or otherwise determining the channel status for each downlink beamforming direction between a parent node and a relay node. The relay node may determine the channel status based, at least in some aspects, on a downlink beamforming direction between the relay node and one or more child nodes. The relay node may transmit or otherwise provide a report to the parent node that indicates at least a portion or subset of the channel statuses and, in some aspects, indicates a respective downlink beamforming direction from the plurality of downlink beamforming directions corresponding to each respective channel status.

The parent node may receive the report from the relay node and respond with the grant to the relay node indicating at least one (e.g., a first) downlink beamforming direction based on the report. The grant may also carry or convey an indication of resources (e.g., a radio resource allocation in time and/or frequency) corresponding to the first downlink beamforming direction for a non-full duplex mode as well as for a full-duplex mode. The relay node may monitor for and receive a downlink transmission from the parent node according to the grant and the first downlink beamforming direction. The relay node may concurrently transmit a downstream transmission to its child node using at least a portion of the allocated resources and based, at least in some aspects, on the first downlink beamforming direction.

In the uplink, the relay node may identify or otherwise determine a channel status for each of the plurality of uplink beamforming directions between the parent node and the relay node based, at least in some aspects, on an uplink beamforming direction between the relay node and the child node. The relay node may then transmit or otherwise convey one or more uplink reference signals to the parent node using at least a portion of the plurality of uplink beamforming directions, e.g., based on the channel statuses. The relay node may indicate to the parent node whether the uplink reference signals is for the full duplex mode or the non-full duplex mode in the report and/or in a separate transmission.

The parent node may use the uplink reference signals and indication to identify or otherwise determine the first uplink beamforming direction from the plurality of uplink beamforming directions. Accordingly, the parent node may transmit or otherwise convey a grant to the relay node indicating the first uplink beamforming direction as well as the resources (e.g., radio resource allocation in time and/or frequency) for uplink communications using the first uplink beamforming direction. The parent node may then monitor for and receive an uplink transmission from the relay node according to the grant and the first uplink beamforming direction. The relay node may concurrently monitor for and receive uplink transmission(s) from the child node and/or a UE using the granted resources and based, at least in some aspects, on the first uplink beamforming direction.

A method of wireless communication at a relay node is described. The method may include determining a channel status for each of a set of downlink beamforming directions between a parent node and the relay node based on a downlink beamforming direction between the relay node and a child node, transmitting a report to the parent node indicating at least a subset of the channel statuses and an indication that a respective downlink beamforming direction of the set of downlink beamforming directions corresponds to a respective channel status in the subset of the channel statuses, receiving a grant from the parent node indicating a first downlink beamforming direction from the set of downlink beamforming directions, and monitoring for a downlink transmission from the parent node based on the grant and the first downlink beamforming direction.

An apparatus for wireless communication at a relay node is described. The apparatus may include a processor, memory coupled with the processor, and instructions stored in the memory. The instructions may be executable by the processor to cause the apparatus to determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

Another apparatus for wireless communication at a relay node is described. The apparatus may include means for determining a channel status for each of a set of downlink beamforming directions between a parent node and the relay node based on a downlink beamforming direction between the relay node and a child node, transmitting a report to the parent node indicating at least a subset of the channel statuses and an indication that a respective downlink beamforming direction of the set of downlink beamforming directions corresponds to a respective channel status in the subset of the channel statuses, receiving a grant from the parent node indicating a first downlink beamforming direction from the set of downlink beamforming directions, and monitoring for a downlink transmission from the parent node based on the grant and the first downlink beamforming direction.

A non-transitory computer-readable medium storing code for wireless communication at a relay node is described. The code may include instructions executable by a processor to determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

In some examples of the method, apparatuses, and non-transitory computer-readable medium described herein, receiving the grant further may include operations, features, means, or instructions for receiving the grant indicating a resource allocation for simultaneous transmission and reception by the relay node when operating in a full duplex mode.

Some examples of the method, apparatuses, and non-transitory computer-readable medium described herein may further include operations, features, means, or instructions for receiving the downlink transmission from the parent node within the resource allocation, and transmitting a second downlink transmission to the child node within the resource allocation via the downlink beamforming direction between the relay node and the child node.

Some examples of the method, apparatuses, and non-transitory computer-readable medium described herein may further include operations, features, means, or instructions for communicating a reference signal or a synchronization signal with the child node, where the downlink beamforming direction between the relay node and the child node may be identified based on the communicating.

Some examples of the method, apparatuses, and non-transitory computer-readable medium described herein may further include operations, features, means, or instructions for identifying a self-interference level between each downlink beamforming direction in the set of downlink beamforming directions between the parent node and the relay node and the downlink beamforming direction between the relay node and the child node, and determining, for a full duplex mode, the channel status for each of the set of downlink beamforming directions between the parent node and the relay node based on the identified self-interference levels.

In some examples of the method, apparatuses, and non-transitory computer-readable medium described herein, determining the channel status for each of the set of downlink beamforming directions further may include operations, features, means, or instructions for determining, for a non-full duplex mode, a first channel status for each of the set of downlink beamforming directions between the parent node and the relay node, and determining, for a full duplex mode, a second channel status for each of the set of downlink beamforming directions between the parent node and the relay node, where the report indicating the subset of the channel statuses may be based on the first and second channel statuses.

In some examples of the method, apparatuses, and non-transitory computer-readable medium described herein, determining the channel status for each of the set of downlink beamforming directions may include operations, features, means, or instructions for determining a beamforming channel gain for each of the set of downlink beamforming directions between the parent node and the relay node, where the first channel status for each of the set of downlink beamforming directions between the parent node and the relay node may be determined based on the beamforming channel gain for each of the set of downlink beamforming directions between the parent node and the relay node, and determining a ratio of beamforming channel gain over self-interference level for each of the set of downlink beamforming directions between the parent node and the relay node based on the identified self-interference levels and the determined beamforming channel gains, where the second channel status for each of the set of downlink beamforming directions between the parent node and the relay node may be determined based on the ratio.

Some examples of the method, apparatuses, and non-transitory computer-readable medium described herein may further include operations, features, means, or instructions for determining, based on the grant, a non-full duplex mode downlink beamforming direction for non-full duplex transmissions from the parent node, and determining, based on the grant, a full duplex downlink beamforming direction for full duplex mode for full duplex communications between the parent node and the relay node, for full duplex communications between the relay node and the child node, or a combination thereof.

In some examples of the method, apparatuses, and non-transitory computer-readable medium described herein, the child node may be a UE or a second relay node.

In some examples of the method, apparatuses, and non-transitory computer-readable medium described herein, the relay node includes a relay node within an IAB network.

A method of wireless communication at a relay node is described. The method may include determining a channel status for each of a set of uplink beamforming directions between a parent node and the relay node based on an uplink beamforming direction between the relay node and a child node, transmitting an uplink reference signal to the parent node using at least a subset of the set of uplink beamforming directions based on the channel statuses, receiving a grant from the parent node indicating a first uplink beamforming direction from the set of uplink beamforming directions, and transmitting, via the first uplink beamforming direction, an uplink transmission to the parent node based on the grant.

An apparatus for wireless communication at a relay node is described. The apparatus may include a processor, memory coupled with the processor, and instructions stored in the memory. The instructions may be executable by the processor to cause the apparatus to determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

Another apparatus for wireless communication at a relay node is described. The apparatus may include means for determining a channel status for each of a set of uplink beamforming directions between a parent node and the relay node based on an uplink beamforming direction between the relay node and a child node, transmitting an uplink reference signal to the parent node using at least a subset of the set of uplink beamforming directions based on the channel statuses, receiving a grant from the parent node indicating a first uplink beamforming direction from the set of uplink beamforming directions, and transmitting, via the first uplink beamforming direction, an uplink transmission to the parent node based on the grant.

A non-transitory computer-readable medium storing code for wireless communication at a relay node is described. The code may include instructions executable by a processor to determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

In some examples of the method, apparatuses, and non-transitory computer-readable medium described herein, receiving the grant may include operations, features, means, or instructions for receiving the grant indicating a resource allocation for simultaneous transmission and reception by the relay node when operating in a full duplex mode.

In some examples of the method, apparatuses, and non-transitory computer-readable medium described herein, transmitting the uplink transmission further may include operations, features, means, or instructions for transmitting the uplink transmission to the parent node within the resource allocation, the method further including.

Some examples of the method, apparatuses, and non-transitory computer-readable medium described herein may further include operations, features, means, or instructions for communicating a reference signal or a synchronization signal with the child node, where the uplink beamforming direction between the relay node and the child node may be identified based on the communicating.

Some examples of the method, apparatuses, and non-transitory computer-readable medium described herein may further include operations, features, means, or instructions for identifying a self-interference level between each beamforming direction in the set of uplink beamforming directions between the parent node and the relay node and the uplink beamforming direction between the relay node and the child node, and determining, for a full duplex mode, the channel status for each of a set of uplink beamforming directions between the parent node and the relay node based on the identified self-interference levels.

In some examples of the method, apparatuses, and non-transitory computer-readable medium described herein, transmitting the uplink reference signal further may include operations, features, means, or instructions for transmitting, for a non-full duplex mode, a first uplink reference signal to the parent node, and transmitting, for a full duplex mode, a second uplink reference signal to the parent node, where the grant indicating the first uplink beamforming direction may be based on the first uplink reference signal and the second uplink reference signal.

Some examples of the method, apparatuses, and non-transitory computer-readable medium described herein may further include operations, features, means, or instructions for transmitting a signal to the parent node identifying the first uplink reference signal for the non-full duplex mode and the second uplink reference signal for the full duplex mode.

In some examples of the method, apparatuses, and non-transitory computer-readable medium described herein, transmitting the uplink reference signal further may include operations, features, means, or instructions for transmitting the first uplink reference signal within a first resource associated with the non-full duplex mode, and transmitting the second uplink reference signal within a second resource associated with the full duplex mode.

Some examples of the method, apparatuses, and non-transitory computer-readable medium described herein may further include operations, features, means, or instructions for determining, based on the grant, a non-full duplex mode uplink beamforming direction for non-full duplex transmissions to the parent node, and determining, based on the grant, a full duplex uplink beamforming direction for a full duplex mode for full duplex communications between the parent node and the relay node, for full duplex communications between the relay node and the child node, or a combination thereof.

In some examples of the method, apparatuses, and non-transitory computer-readable medium described herein, the relay node includes a relay node within an IAB network.

A method of wireless communications at a parent node is described. The method may include receiving a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmitting a grant to the relay node indicating a first downlink beamforming direction from the set of downlink beamforming directions based on the report, and transmitting a downlink transmission to the relay node based on the grant and the first downlink beamforming direction.

An apparatus for wireless communications at a parent node is described. The apparatus may include a processor, memory coupled with the processor, and instructions stored in the memory. The instructions may be executable by the processor to cause the apparatus to receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

Another apparatus for wireless communications at a parent node is described. The apparatus may include means for receiving a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmitting a grant to the relay node indicating a first downlink beamforming direction from the set of downlink beamforming directions based on the report, and transmitting a downlink transmission to the relay node based on the grant and the first downlink beamforming direction.

A non-transitory computer-readable medium storing code for wireless communications at a parent node is described. The code may include instructions executable by a processor to receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

In some examples of the method, apparatuses, and non-transitory computer-readable medium described herein, transmitting the grant further may include operations, features, means, or instructions for transmitting the grant indicating a resource allocation for simultaneous transmission and reception by the relay node when operating in a full duplex mode.

Some examples of the method, apparatuses, and non-transitory computer-readable medium described herein may further include operations, features, means, or instructions for transmitting the downlink transmission from the parent node within the resource allocation.

Some examples of the method, apparatuses, and non-transitory computer-readable medium described herein may further include operations, features, means, or instructions for selecting the first downlink beamforming direction from the set of downlink beamforming directions for the resource allocation based on the report.

In some examples of the method, apparatuses, and non-transitory computer-readable medium described herein, transmitting the grant may include operations, features, means, or instructions for transmitting the grant to identify, for a non-full duplex mode, a second downlink beamforming direction for non-full duplex transmissions from the parent node, and transmitting the grant to identify, for a full duplex mode, the first downlink beamforming direction for the full duplex mode for full duplex communications between the parent node and the relay node, for full duplex communications between the relay node and the child node, or a combination thereof.

In some examples of the method, apparatuses, and non-transitory computer-readable medium described herein, the child node includes a UE or a second relay node.

In some examples of the method, apparatuses, and non-transitory computer-readable medium described herein, the parent node includes a parent relay node within an IAB network.

A method of wireless communications at a parent node is described. The method may include receiving an uplink reference signal from a relay node transmitted using a subset of a set of uplink beamforming directions, transmitting a grant to the relay node indicating a first uplink beamforming direction from the set of uplink beamforming directions based on the uplink reference signal, and monitoring for an uplink transmission from the relay node based on the grant and the first uplink beamforming direction.

An apparatus for wireless communications at a parent node is described. The apparatus may include a processor, memory coupled with the processor, and instructions stored in the memory. The instructions may be executable by the processor to cause the apparatus to receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction.

Another apparatus for wireless communications at a parent node is described. The apparatus may include means for receiving an uplink reference signal from a relay node transmitted using a subset of a set of uplink beamforming directions, transmitting a grant to the relay node indicating a first uplink beamforming direction from the set of uplink beamforming directions based on the uplink reference signal, and monitoring for an uplink transmission from the relay node based on the grant and the first uplink beamforming direction.

A non-transitory computer-readable medium storing code for wireless communications at a parent node is described. The code may include instructions executable by a processor to receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction.

In some examples of the method, apparatuses, and non-transitory computer-readable medium described herein, transmitting the grant may include operations, features, means, or instructions for transmitting the grant indicating a resource allocation for simultaneous transmission and reception by the relay node when operating in a full duplex mode.

Some examples of the method, apparatuses, and non-transitory computer-readable medium described herein may further include operations, features, means, or instructions for receiving the uplink transmission from the relay node within the resource allocation.

Some examples of the method, apparatuses, and non-transitory computer-readable medium described herein may further include operations, features, means, or instructions for selecting the first uplink beamforming direction from the set of uplink beamforming directions for the resource allocation based on the uplink reference signal.

In some examples of the method, apparatuses, and non-transitory computer-readable medium described herein, receiving the uplink reference signal may include operations, features, means, or instructions for receiving, for a non-full duplex mode, a first uplink reference signal from the relay node, and receiving, for a full duplex mode, a second uplink reference signal from the relay node, where the grant indicating the first uplink beamforming direction may be based on the first uplink reference signal and the second uplink reference signal.

Some examples of the method, apparatuses, and non-transitory computer-readable medium described herein may further include operations, features, means, or instructions for receiving a signal from the relay node identifying the first uplink reference signal for the non-full duplex mode and the second uplink reference signal for the full duplex mode.

Some examples of the method, apparatuses, and non-transitory computer-readable medium described herein may further include operations, features, means, or instructions for receiving the first uplink reference signal via a first resource associated with the non-full duplex mode, and receiving the second uplink reference signal via a second resource associated with the full duplex mode.

In some examples of the method, apparatuses, and non-transitory computer-readable medium described herein, the parent node includes a parent node within an IAB network.

DETAILED DESCRIPTION

Figure 1:
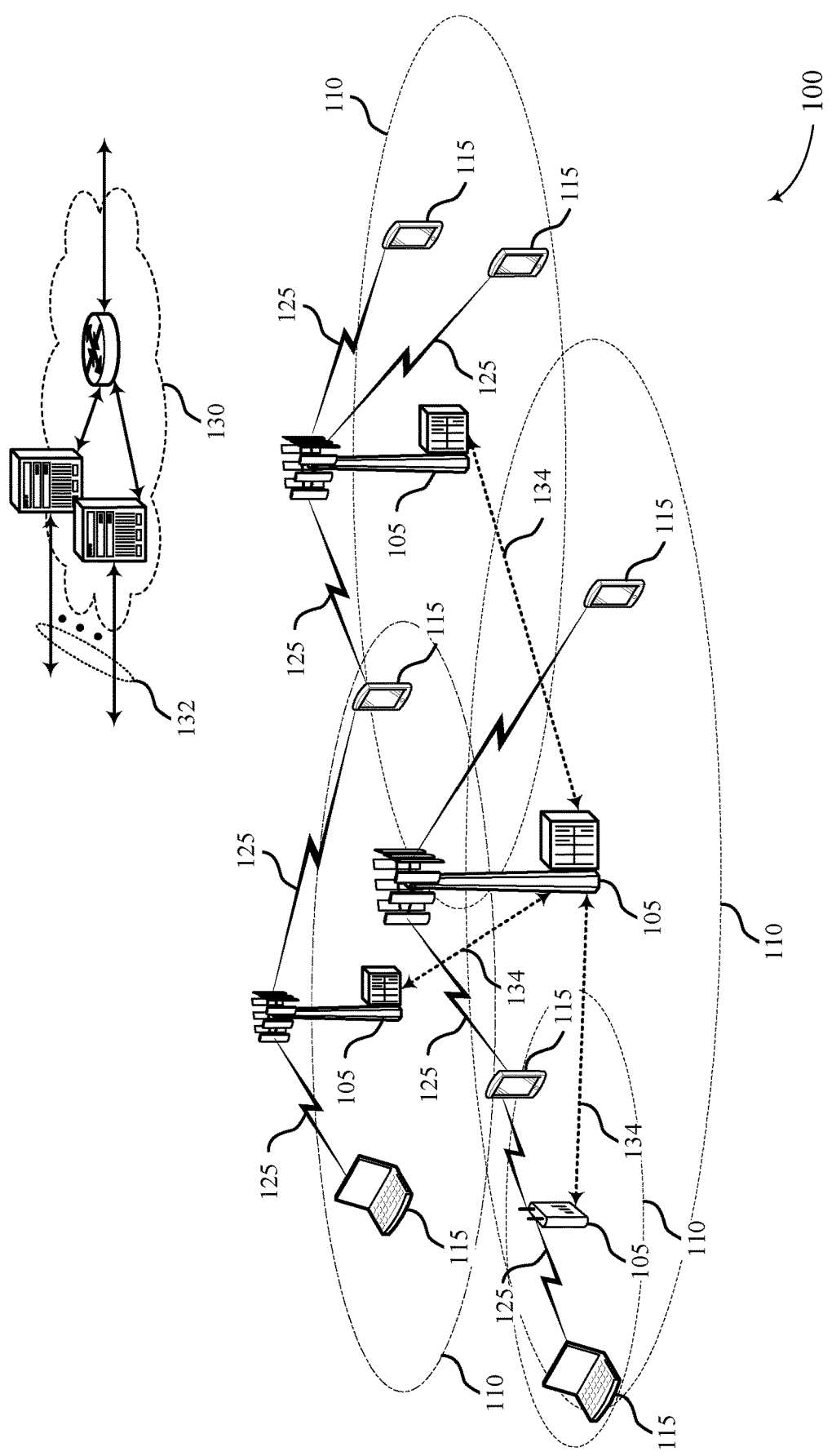
FIG. 1 illustrates an example of a system for wireless communications that supports beamforming determination for integrated access and backhaul (IAB) system with full duplex in accordance with aspects of the present disclosure.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the user equipment (UE) may be beamformed, e.g., using a transmit beam. Moreover, a receiving device may use beamforming techniques to configure antenna(s) and/or antenna array(s) such that transmissions are received in a directional manner, e.g., using a receive beam.

Some wireless communication systems may support an integrated access and backhaul (IAB) network that includes an IAB donor (or anchor) node and one or more relay nodes downstream from the donor node. In some aspects, an IAB network shares resources between access and backhaul links. Generally, the IAB donor node (which may also be referred to as an anchor node) is an access node having a wireline connection to the core network. The donor node may have a central unit (CU) function that is a central entity that controls or otherwise configures resources within the IAB network. The donor node may also have a distributed unit (DU) function that serves as a scheduling node to schedule child nodes (e.g., UEs) of the IAB donor node. Downstream from the IAB donor node may include one or more IAB nodes (also referred to as parent nodes, relay nodes, and/or child nodes, depending upon where the node is within the IAB network) within the IAB network, with each relay node constituting a hop within the IAB network.

Each IAB node may relay traffic from a donor node through one or more hops (e.g., relay nodes). In one example, each IAB node may have the DU function (e.g., a first communication link interface) and a mobile termination (MT) function (e.g., a second communication link interface). The DU function of the relay node may act as a scheduling node that schedules child nodes of this particular relay node, which may be a UE and/or a downstream child node (e.g., a UE and/or a base station within the IAB network). The MT function may serve as a scheduled node similar to a UE that is scheduled by its parent node. In this context, the parent node may be a donor node (e.g., an anchor node) or a parent node within the IAB network (e.g., an upstream wireless node from the perspective of the relay node). Similarly, a child node may include a downstream relay node within the IAB network from the perspective of an upstream donor node or parent node.

Aspects of the disclosure are initially described in the context of a wireless communications system. The described techniques relate to improved methods, systems, devices, and apparatuses that support beamforming determination for IAB system with full duplex. Generally, the described techniques provide for various techniques to support beamform direction selection, for downlink and uplink, in an IAB network that is configured or otherwise supports both non-full duplex and full duplex communications. In the downlink, this may include a relay node identifying or otherwise determining the channel status for each downlink beamforming direction between its parent node and the relay node. The relay node may determine the channel status based, at least in some aspects, on a (or plurality of) downlink beamforming direction between the relay node and one or more child nodes. The relay node may transmit or otherwise provide a report to the parent node that indicates at least a portion or subset of the channel statuses and, in some aspects, indicates a respective downlink beamforming direction from the plurality of downlink beamforming directions corresponding to the respective channel status.

The parent node may receive the report from the relay node and respond with the grant to the relay node indicating at least one (e.g., a first) downlink beamforming direction based on the report. The grant may also carry or convey an indication of resources corresponding to the first downlink beamforming direction for a non-full duplex mode as well as for a full-duplex mode. The relay node may monitor for and receive a downlink transmission from the parent node according to the grant and the first downlink beamforming direction.

In the uplink, the relay node may identify or otherwise determine a channel status for each of the plurality of uplink beamforming directions between its parent node and the relay node based, at least in some aspects, on an uplink beamforming direction between the relay node and its child node(s). The relay node may then transmit or otherwise convey one or more uplink reference signals to the parent node using at least a portion of the plurality of uplink beamforming directions, e.g., based on the channel statuses. The parent node may use the uplink reference signals to identify or otherwise determine the first uplink beamforming direction from the plurality of uplink beamforming directions. Accordingly, the parent node may transmit or otherwise convey a grant to the relay node indicating the first uplink beamforming direction as well as the resources for uplink communications using the first uplink beamforming direction. The parent node may then monitor for and receive an uplink transmission from the relay node according to the grant and the first uplink beamforming direction. The relay node may concurrently receive an uplink transmission from its child node(s) using at least a portion of the resources indicated in the grant.

Aspects of the disclosure are further illustrated by and described with reference to apparatus diagrams, system diagrams, and flowcharts that relate to beamforming determination for IAB system with full duplex.

FIG. 1 illustrates an example of a wireless communications system 100 that supports beamforming determination for IAB system with full duplex in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A relay node (e.g., a base station 105 and/or a UE 115 acting or otherwise configured as a relay node within an IAB network) may determine a channel status for each of a plurality of downlink beamforming directions between a parent node and the relay node based at least in part on a downlink beamforming direction between the relay node and a child node. The relay node may transmit a report to the parent node indicating at least a subset of the channel statuses and an indication that a respective downlink beamforming direction of the plurality of downlink beamforming directions corresponds to a respective channel status in the subset of the channel statuses. The relay node may receive a grant from the parent node indicating a first downlink beamforming direction from the plurality of downlink beamforming directions. The relay node may monitor for a downlink transmission from the parent node based at least in part on the grant and the first downlink beamforming direction.

A relay node (e.g., a base station 105 and/or a UE 115 acting or otherwise configured as a relay node within an IAB network) may determine a channel status for each of a plurality of uplink beamforming directions between a parent node and the relay node based at least in part on an uplink beamforming direction between the relay node and a child node. The relay node may transmit an uplink reference signal to the parent node using at least a subset of the plurality of uplink beamforming directions based at least in part on the channel statuses. The relay node may receive a grant from the parent node indicating a first uplink beamforming direction from the plurality of uplink beamforming directions. The relay node may transmit, via the first uplink beamforming direction, an uplink transmission to the parent node based at least in part on the grant.

A parent node (e.g., a base station 105 and/or a UE 115 acting or otherwise configured as a parent node within an IAB network) may receive a report from a relay node indicating a set of channel statuses and a respective downlink beamforming direction of a plurality of downlink beamforming directions between the parent node and the relay node that corresponds to a respective channel status in the set the channel statuses, the set of channel statuses determined for the plurality of downlink beamforming directions between the parent node and the relay node based at least in part on a downlink beamforming direction between the relay node and a child node. The parent node may transmit a grant to the relay node indicating a first downlink beamforming direction from the plurality of downlink beamforming directions based at least in part on the report. The parent node may transmit a downlink transmission to the relay node based at least in part on the grant and the first downlink beamforming direction.

A parent node (e.g., a base station 105 and/or a UE 115 acting or otherwise configured as a parent node within an IAB network) may receive an uplink reference signal from a relay node transmitted using a subset of a plurality of uplink beamforming directions. The parent node may transmit a grant to the relay node indicating a first uplink beamforming direction from the plurality of uplink beamforming directions based at least in part on the uplink reference signal. The parent node may monitor for an uplink transmission from the relay node based at least in part on the grant and the first uplink beamforming direction.

Figure 2:
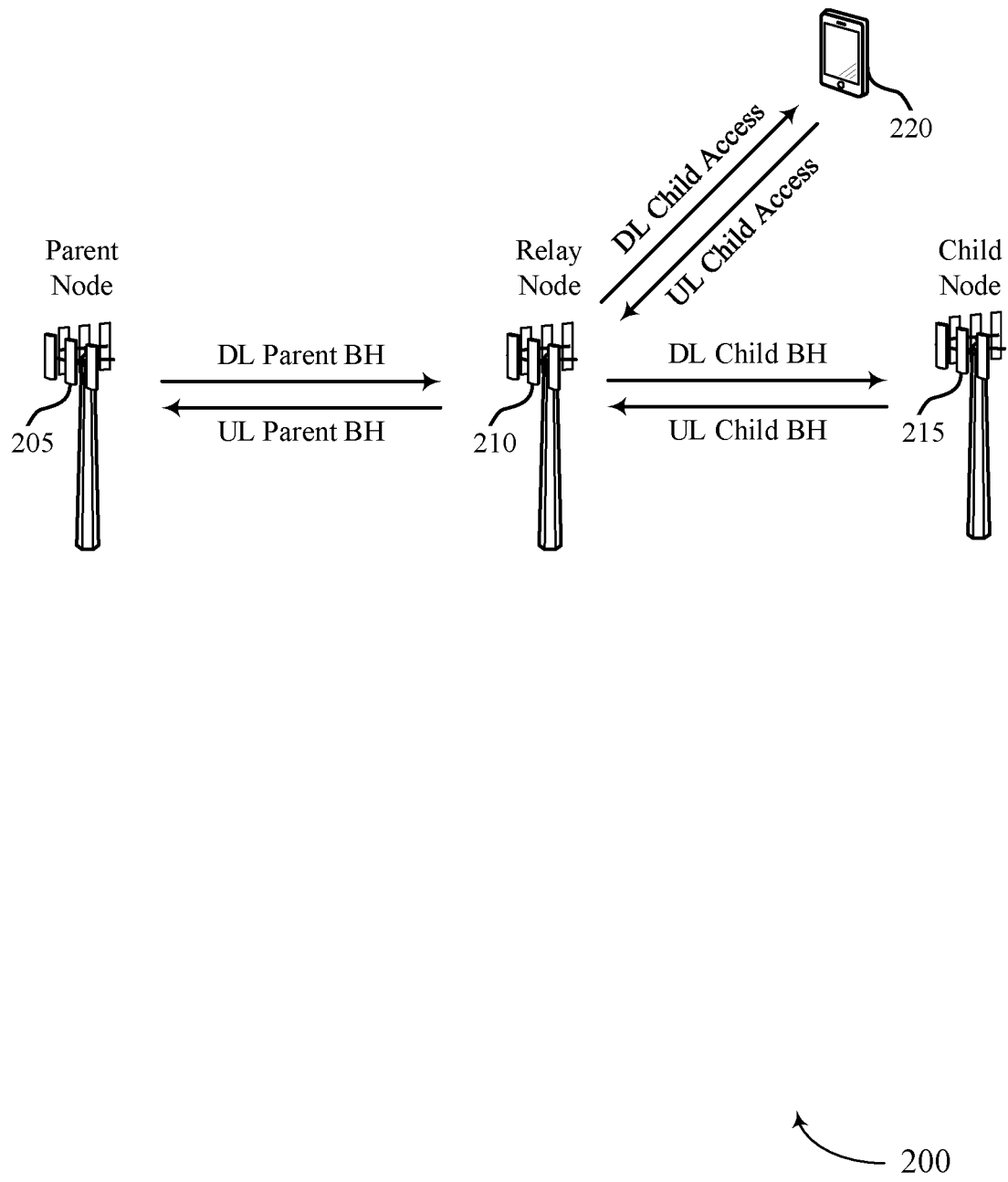
FIG. 2 illustrates an example of a wireless communication system in accordance with aspects of the present disclosure.

FIG. 2 illustrates an example of a wireless communication system 200 that supports beamforming determination for IAB system with full duplex in accordance with aspects of the present disclosure. In some examples, wireless communication system 200 may implement aspects of wireless communication system 100. Wireless communication system 200 may include parent node 205, relay node 210, child node 215, and UE 220, which may be examples of corresponding devices described herein. More particularly, parent node 205, relay node 210, and/or child node 215 may be examples of the UE (such as UE 220) or a base station, such as described herein. Wireless communication system 200 may be configured, at least to some aspects, as an IAB network. Accordingly, parent node 205, relay node 210, and/or child node 215 may be considered nodes within the IAB network.

Next generation (e.g., 5G) wireless networks are expected to provide ultra-high data rates and support a wide scope of application scenarios. Wireless full duplex (FD) communications may double the link capacity and support radio network nodes transmitting and receiving simultaneously on the same frequency band and at the same time slot. This contrasts with half duplex operations where transmission and reception either differ in time or in frequency.

In some cases, an IAB system (such as wireless communication system 200) may include an IAB-donor (e.g., parent node 205, in some examples), an IAB node (e.g., relay node 210 and/or child node 215) and UE (e.g., UE 220). Multiple IAB nodes may be connected in line to improve coverage, where for a certain IAB node, the node closer to the IAB donor (e.g., an upstream node) is called as its parent node, and the one on the other side (e.g., a downstream node) is called as its child node. Thus, parent node 205 may be closer to a donor node or anchor node than relay node 210 and/or child node 215. Parent node 205 may be a parent node with respect to relay node 210 and a grandparent node with respect to child node 215. In some aspects, parent node 205 may be a donor node or may simply be an upstream relay node within the IAB network from the perspective of relay node 210 and/or child node 215. Relay node 210 may be considered a child node from the perspective of parent node 205 and a parent node from the perspective of child node 215.

For a certain IAB node (e.g., relay node 210), there may be six kinds or types of links: a downlink (DL) parent backhaul (BH) link and an uplink (UL) parent BH link with its parent node, a DL child BH link and an UL child BH link with its child node, and a DL access link and UL access link with its served UE. Accordingly, relay node 210 may have DL and UL parent BH links with parent node 205, DL and UL child BH links with child node 215, and DL and UL access links with UE 220. In some examples, relay node 210 may also have DL and UL access links with child node 215 for access communications, e.g., similar to the DL and UL access links with UE 220.

In a legacy IAB system without full duplex, for an IAB node, its transmission and reception cannot be performed concurrently. Among its six kinds of links (e.g., from the perspective of relay node 210), the DL parent BH, UL child BH and UL access links are reception links, while the UL parent BH, DL child BH and DL access links are transmission links. Any reception link and any transmission link cannot have data transfer concurrently in a non-full duplex mode of operations. When the transmission and reception traffic are static, the pattern for non-concurrent transmission and reception time slots can be based according to the proportion of transmission traffic and reception traffic. However, when the transmission and reception traffic are dynamic, or some urgent traffic occurs in an inverse-direction time slot, such non-concurrent transmission-reception pattern cannot satisfy the requirements. Moreover, the half-duplex mode restricts the radio resource spectrum efficiency and hence lowers the system throughput. Accordingly, aspects of the described techniques may support using full duplex technology to enable concurrent transmission and reception at IAB node (such as relay node 210), such that the dynamic traffic allocation, improved system capacity, and the capability to quickly deliver any directional packet is supported.

In accordance with aspects of the described techniques, a full-duplex network node (e.g., parent node 205, relay node 210, and/or child node 215), such as a base station and/or UE in a cellular network, may communicate simultaneously in uplink and downlink with two half-duplex terminals using the same radio resources. Another example wireless full duplex application scenario is that one relay node can communicate simultaneously with the anchor node and the mobile terminal in a one-hop scenario, or with the other two relay nodes in a multi-hop scenario. By doubling each single-link capacity, full duplexing significantly increases the system throughput in diverse applications in wireless communication network 200, and also reduces the transfer latency for time critical services.

Aspects of the described techniques support deciding an enhanced (e.g., optimal) beamforming direction (e.g., precoding weight) in an IAB node chain where the full duplex mode is activated at each IAB node (e.g., each parent node 205, relay node 210, and/or child node 215 of the IAB network), because the DL/UL beamforming parameters and channel statuses along the chain may be closely coupled.

Aspects of the described techniques provide an efficient scheme that supports the parent node 205 determining the beamforming direction (e.g., precoding weight) for the parent BH link based on IAB node's (e.g., relay node 210) feedback information on its full duplex beamforming direction (e.g., precoding weight).

Aspects of the described techniques may support in-band full-duplex transmissions. One aspect of enabling full-duplex transmissions is the capability to cancel self-interference from downlink to uplink, or vice versa. The nodes of wireless communication system 200 may support full-duplex radio designs that can suppress up to 110 dBm, or more, of such self-interference by combining the technologies of beamforming, analog cancellation, digital cancellation, antenna cancellation, and the like. Aspects of the describe techniques support beamforming direction determination in both downlink (or downstream) and uplink (or upstream) transmissions within the IAB network.

In the downlink scenario, this may include an IAB system with full duplex (e.g., wireless communication system 200) where, for a particular IAB node (e.g., relay node 210), the transmission(s) and reception(s) are being performed concurrently. The transmitted signal with a certain beamforming direction (e.g., precoding matrix, antenna port, etc.) may cause self-interference with respect to the received signal and different beamforming directions would cause different self-interference strengths. To reduce or eliminate such self-interference, aspects of the described techniques may include the signal being transmitted in a proper beamforming direction(s) (e.g., in at least a first downlink or uplink beamforming direction). Due to this, aspects of the described techniques may support a beamforming direction determination scheme for the IAB node with full duplex, such as relay node 210.

In some aspects, the downlink data transfer of information (e.g., downlink transmission(s)) may include the relay node 210 determining a channel status for each of a plurality of downlink beamforming directions between parent node 205 and relay node 210 based at least in part on a downlink beamforming direction between relay node 210 and child node 215. For example, relay node 210 may determine a plurality of beamforming directions (e.g., precoding matrixes, antenna ports, etc.) in the DL child BH link between relay node 210 and child node 215 and/or the DL access link between relay node 210 and UE 220. These beamforming directions may be selected to enhance the channel status of the DL child BH link and/or the DL access link. That is, the best of these beamforming directions may constitute the downlink beamforming direction(s) between relay node 210 and child node 215.

Based on the self-interference caused by the determined beamforming direction(s) between relay node 210 and child node 215, relay node 210 may determine the downlink beamforming directions in the DL parent BH link which has at least a defined channel status (e.g., maximum SINR), has a highest channel status, for example, under self-interference. Such beamforming direction may be represented by a channel status information reference signal (CSI-RS) resource indicator (CRI), a precoding matric indicator (PMI), and the like. The relay node 210 may determine the CSI (e.g., CRI, rank indicator (RI), PMI, channel quality indicator (CQI), etc.) of the DL parent BH link between relay node 210 and parent node 205 for a full duplex mode.

Relay node 210 may transmit a report to parent node 205 indicating at least a subset of the channel statuses and an indication that a respective downlink beamforming direction of the plurality of downlink beamforming directions corresponds to a respective channel status in the subset of channel statuses. For example, relay node 210 may report the CSI of the DL parent BH link to parent node 205 for both a non-full duplex mode and a full duplex mode, respectively, for each of the one or more downlink beamforming directions between the relay node 210 and the child node 215.

Parent node 205 may receive the report and transmit a grant to relay node 210 indicating a first downlink beamforming direction from the plurality of downlink beamforming directions based at least in part on the report. For example, parent node 205 may determine the beamforming direction(s) and radio resource allocation(s) for the DL parent BH link for the non-full duplex mode and/or the full duplex mode and then indicate this to relay node 210 in the grant, for example, or in multiple grants.

Relay node 210 may monitor for and receive a downlink transmission from parent node 205 based at least in part on the grant and the first downlink beamforming direction. For example, relay node 210 may use the radio resource(s) for the full duplex mode to schedule the transmission along with the determined beamforming directions at the DL child BH link between relay node 210 and child node 215 and/or the DL access link between relay node 210 and UE 220.

In the uplink scenario, relay node 210 may determine a channel status for each of a plurality of uplink beamforming directions between parent node 205 and relay node 210 based, at least in some aspects, on one or more uplink beamforming directions between relay node 210 and child node 215. For example, relay node 210 may determine a plurality of beamforming directions (e.g., precoding matrixes, antenna ports, etc.) in the UL child BH link between relay node 210 and child node 215 and/or the UL access link between relay node 210 and UE 220. These beamforming directions may be selected to enhance the channel status of the UL child BH link and/or the UL access link. Based on these determined beamforming directions, relay node 210 may determine the beamforming directions in the UL parent BH link that satisfy some kind of criterion (e.g., satisfy a threshold) related to the SINR, for example, at the UL parent BH link, the UL child BH link and/or the UL access links. Such beamforming direction can be represented by SRI, transmitted PMI (TPMI), and the like.

Relay node 210 may transmit an uplink reference signal to parent node 205 using at least a subset of the plurality of uplink beamforming directions between relay node 210 and parent node 205 based, at least in some aspects, on the channel statuses. For example, relay node 210 may transmit or otherwise send sounding reference signal (SRS) transmission(s) in the determined beamforming directions on the UL parent BH link to parent node 205. Relay node 210 may also indicate to parent node 205 whether each transmitted SRS is for a full duplex mode or a non-full duplex mode. For example, relay node 210 may transmit a first uplink reference signal (or synchronization signal) to parent node 205 for a non-full duplex mode and a second uplink reference signal (or synchronization signal) to parent node 205 for a full duplex mode. Relay node 210 may also indicate to parent node 205 which reference signal is for which mode, e.g., either full duplex or non-full duplex.

Parent node 205 may receive the uplink reference signal(s) from relay node 210 and transmit a grant to relay node 210 indicating a first uplink beamforming direction from the plurality of beamforming directions based, at least in some aspects, on the uplink reference signal(s). For example, parent node 205 may determine the beamforming direction(s) and radio resource allocation(s) for the UL parent BH link for the non-full duplex mode and for the full duplex mode respectively, and then indicate this information to relay node 210.

Relay node 210 may receive the grant from parent node 205 and transmit an uplink transmission to parent node 205 using the first uplink beamforming direction and based at least in part on the grant. For example, relay node 210 may use the radio resource(s) for the full duplex mode to schedule UL child BH link and/or UL access link transmissions, along with the determined beamforming directions at the UL child BH link and/or the UL access link.

Accordingly, wireless communication system 200 provides or is otherwise configured to support a method for a full duplex based IAB network to execute beamforming determination for both downlink and uplink data transfers. In the determination process, the beamformed channel status in the parent backhaul link, child backhaul link and/or access link are jointly considered, and the scheduling result is targeted to generate enhanced and balanced throughputs in all of these links. Wireless communication system 200 leverages aspects of conventional techniques, but adds a small number of additional information elements between relay node 210 and its parent node 205.

Figure 3:
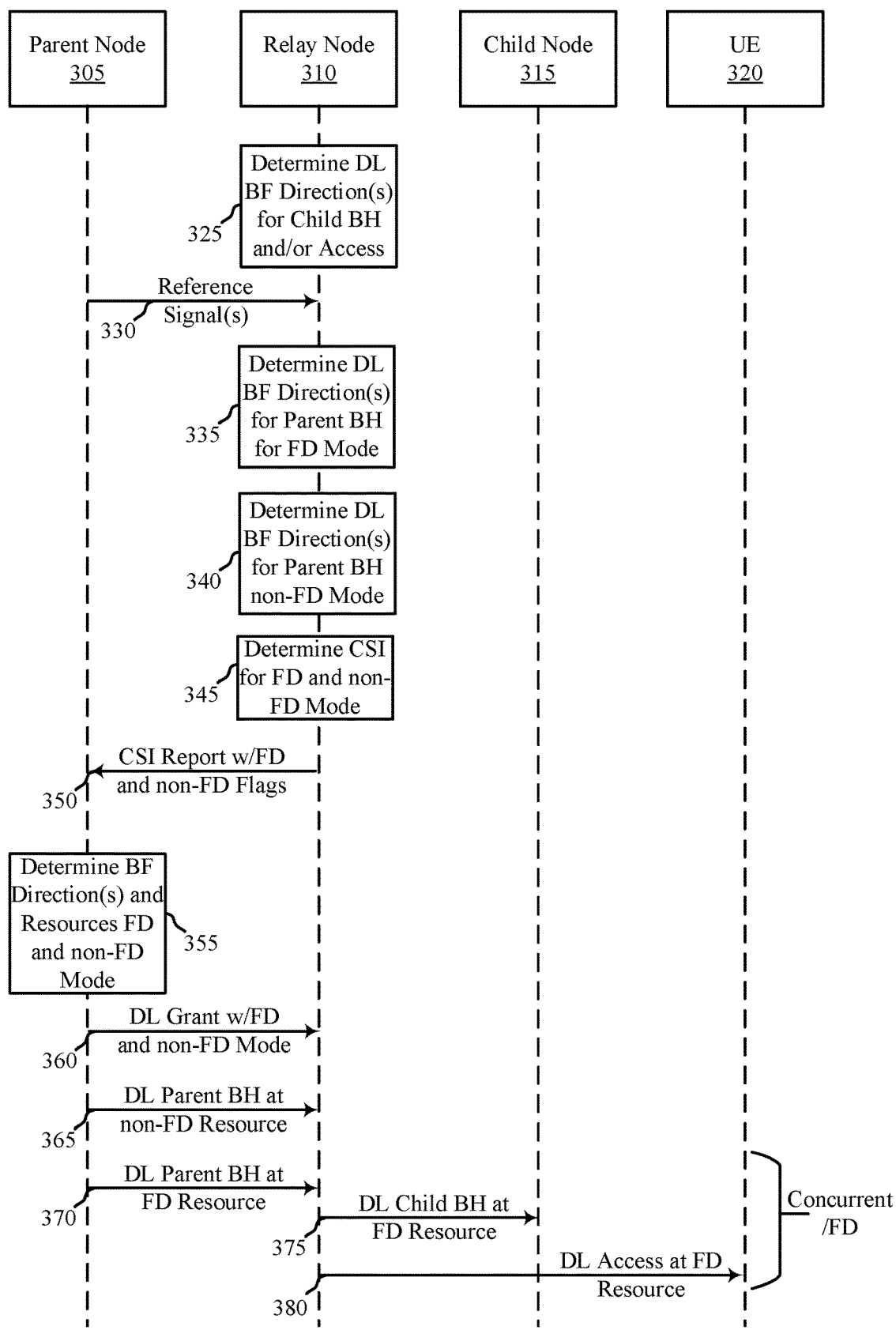
FIG. 3 illustrates an example of a process in accordance with aspects of the present disclosure.

FIG. 3 illustrates an example of a process 300 that supports beamforming determination for IAB system with full duplex in accordance with aspects of the present disclosure. In some examples, process 300 may implement aspects of wireless communication systems 100 and/or 200. Aspects of process 300 may be implemented by parent node 305, relay node 310, child node 315, and/or UE 320, which may be examples of corresponding devices described herein. That is, parent node 305, relay node 310, and/or child node 315 may be examples of the nodes within an IAB network, which may be implemented in a base station and/or a UE as described herein. Broadly, process 300 illustrates one example for downlink beamform determination in an IAB network.

At 325, relay node 310 may determine a plurality of beamforming directions at the downlink child backhaul link between relay node 310 and child node 315 and/or at the downlink access link between relay node 310 and UE 320. In some aspects, relay node 310 may determine the beamforming directions of the downlink child backhaul link and/or the downlink access link using a variety of approaches. One approach may include relay node 310 transmitting SSB(s), CSI-RS(s), etc., by which child node 315 and/or UE 320 chooses a preferred (e.g., optimal) beamforming direction in the downlink child backhaul or downlink access links, respectively, and then feeds back reporting information to relay node 310, e.g., in a channel status feedback report. Another approach may be that relay node 310 receives SRS(s) from child node 315 and/or UE 320, and then determines the beamforming directions in the uplink child backhaul and/or uplink access links, respectively, according to the quality of the received signal. Relay node 310 may use these beamforming directions in the downlink child backhaul and/or downlink access links according to channel reciprocity.

At 330, parent node 305 may transmit (and relay node 310 may receive) one or more reference signals, such as CSI-RSs.

At 335, relay node 310 may determine a plurality of beamforming directions at the downlink parent backhaul link for a full duplex mode based, at least in some aspects, on the determined beamforming directions at the downlink child backhaul link and/or the downlink access link, e.g., based on the beamforming directions determined at 325. For example, the plurality beamforming directions may be determined based on the beamforming directions determined at 325 and the reference signals received at 330.

At 340, relay node 310 may determine a plurality of beamforming directions at the downlink parent backhaul link for the non-full duplex mode. For example, the plurality beamforming directions may be determined based on the reference signals received at 330.

At 345, relay node 310 may identify or otherwise determine the channel statuses (e.g., CSI) for the non-full duplex mode and for the full duplex mode, respectively.

Accordingly, relay node 310 may determine the beamforming direction's channel statuses (e.g., CSI) in the downlink parent backhaul link for the full duplex mode. This may include relay node 310 determining the beamforming directions in the downlink parent backhaul link based on the channel gain of the beamformed channel in the downlink parent backhaul link (denoted as Sp) and the self-interference caused by the beamformed channel in the downlink child backhaul link and/or downlink access link to the beamformed channel in the downlink parent backhaul link (denoted as I_c2p). The beamformed channel and the downlink child backhaul and/or downlink access links may be generated by the previously determined beamforming directions, e.g., the beamforming directions determined at 325. One example of the criteria that can be used for the selection of the beamforming directions in the downlink parent backhaul link may include, but is not limited to, relay node 310 identifying a beamforming direction associated with a defined (e.g., maximum) value of S_p/I_c2p. Relay node 310 may then determine the channel status or CSI (e.g., CRI, RI, PMI, CQI, etc.) of the downlink parent backhaul link with the full duplex mode. In some aspects, the downlink beamforming direction can be represented by CRI (e.g., if the beamformed CSI-RSS is sent at 330) or PMI (e.g., if the non-beamformed CSI RS is sent at 330).

At 350, relay node 310 may transmit (and parent node 305 may receive) a report (e.g., a CSI report) for the non-full duplex mode and the full duplex mode, with a report containing flags to indicate or otherwise identify the CSI report with the corresponding mode. That is, a report may contain a flag identifying a first CSI as corresponding to the non-full duplex mode and another flag identifying a second CSI as corresponding to the full duplex mode. Thus, relay node 310 may transmit or otherwise send a CSI report for the full duplex mode and the non-full duplex mode to parent node 305, with the flag indicating or identifying the non-full duplex mode and full duplex mode for each CSI (e.g., the subset of channel statuses) contained in the report. The CSI report may indicate a set of channel status information and indicate to which beamforming direction between the parent node 305 and the relay node 310 each instance of the channel status information corresponds.

At 355, parent node 305 may determine the one or more beamforming directions and one or more radio resource allocations (e.g., time, frequency, spatial, code, etc., resources) for the non-full duplex mode and full duplex mode, respectively. In some aspects, the radio resource allocation division between the full duplex mode and the non-full duplex mode may be in the time domain, a frequency domain, or a mixture of the time-frequency domain.

In some aspects, this may include parent node 305 determining the radio resource allocation for the downlink parent backhaul link for the full duplex mode and for the non-full duplex mode, respectively. This may depend on the throughputs, traffic situations, etc., in the downlink parent backhaul link and the downlink child backhaul link and/or downlink access links. For example, assuming the throughput of the downlink parent backhaul link is $T_1$ for the non-full duplex mode and $T_2$ for the full duplex mode, the throughput of the downlink child backhaul/downlink access links may be $T_3$ in the full duplex mode. The target throughput ratio for the downlink parent backhaul link over the downlink child backhaul/downlink access links may be denoted as $\beta$, and the radio resource ratio for the non-full duplex mode over the full duplex mode may be $\gamma$. In this context, parent node 305 may implement the formula:

$$\beta = \frac{T_1 \gamma}{T_2 + T_3}.$$

Therefore, parent node 305 may calculate otherwise determine $$\frac{\gamma}{\gamma + 1}$$

as the radio resource percentage for the non-full duplex mode and $$\frac{1}{\gamma+1}$$

as the radio resource percentage for the full duplex mode, which may be calculated from the values $T_1$, $T_2$, $T_3$, and $\beta$. Next, the non-full duplex mode beamforming direction and the full duplex beamforming direction, as reported by relay node 310 at 350, may be adopted at the allocated radio resources in the downlink parent backhaul link for the full duplex mode and the non-full duplex mode, respectively. In some examples, the parent node 305 may select one or more of the reported beam directions based on the throughput and the corresponding channel status(es).

At 360, parent node 305 may transmit (and relay node 310 may monitor for and receive) a grant (e.g., a downlink grant) identifying at least a first downlink beamformed direction and the radio resource allocations for both the non-full duplex mode and the full duplex mode. For example, the grant may include a first flag identifying the downlink beamforming directions and radio resource allocations for the non-full duplex mode and a second flag identifying the downlink beamforming directions and radio resource allocations for the full duplex mode. Accordingly, parent node 305 may transmit downlink grant(s) for the full duplex mode and the non-full duplex mode to relay node 310, with the grant containing one or more flags indicating or otherwise identifying the non-full duplex mode and the full duplex mode configuration/allocation of each downlink grant.

At 365, parent node 305 may transmit (and relay node 310 may monitor for and receive) a transmission on the downlink parent backhaul link using the beamforming direction and corresponding radio resource allocation for the non-full duplex mode.

At 370, parent node 305 may transmit (and relay node 310 may monitor for and receive) a transmission on the downlink parent backhaul link using the beamforming direction and corresponding radio resource allocation for the full duplex mode.

Concurrently with the transmission at 370, at 375 relay node 310 may transmit (and child node 315 may monitor for and receive) a downlink transmission on the downlink child backhaul link using the beamforming direction and corresponding radio resource allocation for the full duplex mode.

Concurrently with the transmissions at 370 and/or 375, at 380 relay node 310 may transmit (and UE 320 may monitor for and receive) a downlink transmission on the downlink access link using the beamforming direction and corresponding radio resource allocation for the full duplex mode. That is, in accordance with full duplex operations, the transmissions at 370, 375, and/or 380 may be performed concurrently. Accordingly, relay node 310 may receive the downlink transmission from parent node 305 at 370 while performing the downlink transmissions to the child node 315 at 375 and/or to the UE 320 and 380.

Figure 4:
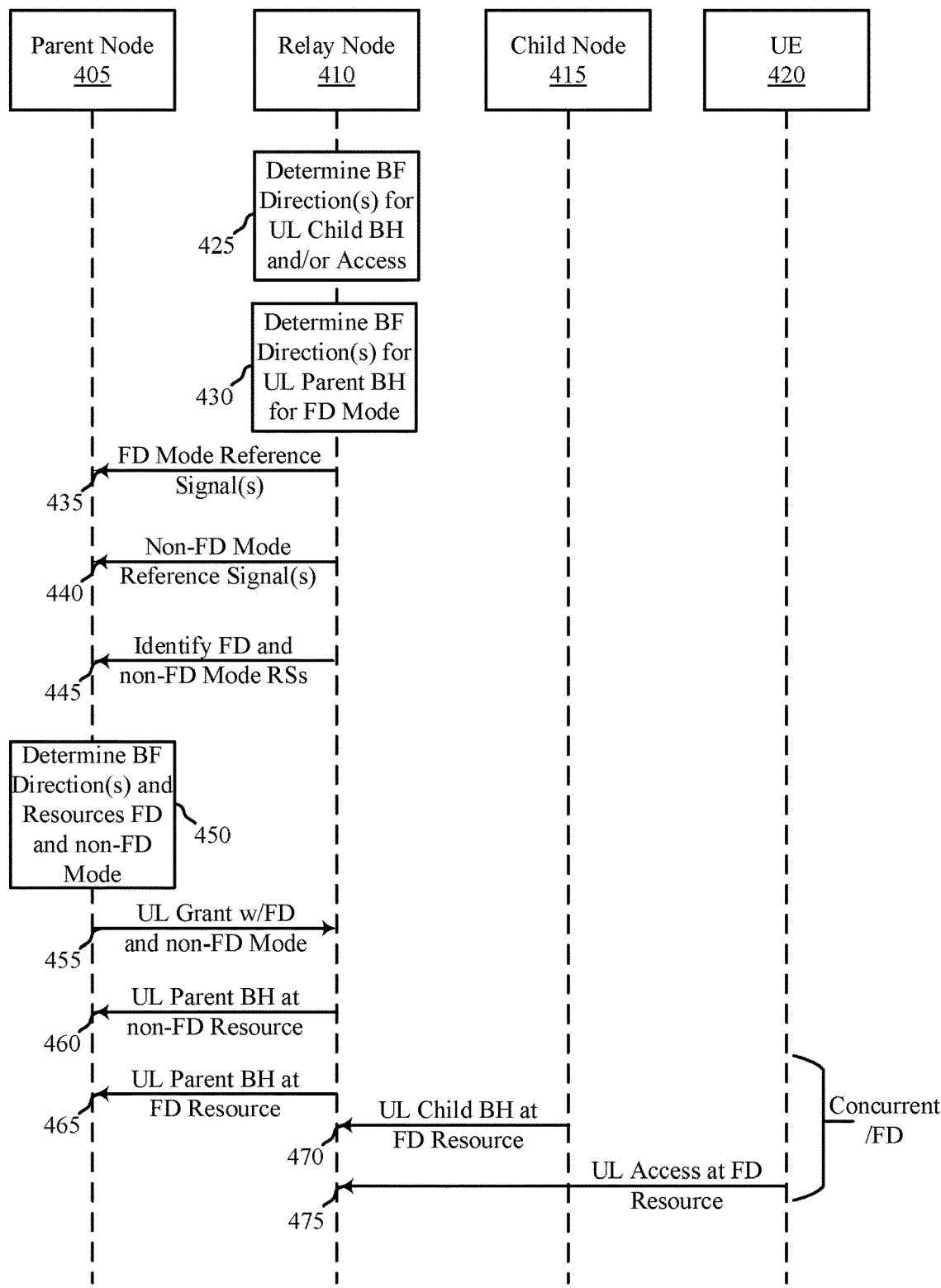
FIG. 4 illustrates an example of a process in accordance with aspects of the present disclosure.

FIG. 4 illustrates an example of a process 400 that supports beamforming determination for IAB system with full duplex in accordance with aspects of the present disclosure. In some examples, process 400 may implement aspects of wireless communication systems 100 and/or 200 or process 300. Aspects of process 400 may be implemented by parent node 405, relay node 410, child node 415, and/or UE 420, which may be examples of corresponding devices described herein. That is, parent node 405, relay node 410, and/or child node 415 may be examples of the nodes within an IAB network, which may be implemented in a base station and/or a UE as described herein. Broadly, process 400 illustrates one example for uplink beamform determination in an IAB network.

At 425, relay node 410 may determine a plurality of beamforming directions at the uplink child backhaul link between relay node 410 and child node 415 and/or at the uplink access link between the relay node 410 and UE 420. For example, in one option relay node 410 may transmit SSBs, CSI-RS, etc., by which the child node 415 and/or UE 420 may use to choose an optimal beamforming direction for the downlink child backhaul link/downlink access link, respectively. Child node 415 and/or UE 420 may then provide a report to relay node 410 indicating feedback information for the respective links. Relay node 410 may use the feedback information (e.g., the identified optimal beamforming directions) as the determined beamforming directions according to a channel reciprocity. In another option, relay node 410 may receive one or more SRS, CSI-RS, etc., from child node 415 and/or UE 420 and use these reference signals to determine the beamforming directions in the uplink child backhaul link and/or uplink access link, respectively, according to the quality of the received uplink signals.

At 430, relay node 410 may determine a plurality of beamforming directions at the uplink parent backhaul link for the full duplex mode based on the determined beamforming directions at the uplink child backhaul link and/or the uplink access link, e.g., as determined at 425.

At 435, relay node 410 may transmit (and parent node 405 may monitor for and receive) an uplink reference signal (e.g., an SRS) for the full duplex mode. At 440, relay node 410 may transmit (and parent node 405 may monitor for and receive) an uplink reference signal (e.g., an SRS) for the non-full duplex mode. In some examples, the SRS for FD mode may be sent along with one or more determined beamforming directions.

At 445, relay node 410 may transmit (and parent node 405 may receive) a signal identifying or otherwise indicating the purpose of the uplink reference signals. For example, the signal may indicate that the uplink reference signal transmitted at 435 corresponds to the full duplex mode and that the uplink reference signal transmitted at 440 corresponds to the non-full duplex mode. In some examples, relay node 410 may implicitly indicate whether the uplink reference signal is for full duplex mode or non-full duplex mode based on the resource position of the uplink reference signal. For example, a first resource may be used to transmit an SRS for non-full duplex mode, and a second, different resource, may be used to transmit SRS for full duplex mode.

Accordingly, relay node 410 may transmit SRS in the uplink parent backhaul link for the full duplex mode and the non-full duplex mode to parent node 405. The SRS for the full duplex mode may be sent along with the determined beamforming direction. Relay node 410 may transmit a message to parent node 405 to indicate whether each SRS is for the non-full duplex mode or for the full duplex mode.

Relay node 410 may determine the beamforming directions for the uplink parent backhaul link for the full duplex mode based, at least in some aspects, on the functions performed at 430, 435, 440, and/or 445. This may include relay node 410 determining the beamforming directions in the uplink parent backhaul link based on the channel gain of the beamformed channel in the uplink parent backhaul link (denoted as S_p) and the self-interference caused from the beamformed channel in the uplink parent backhaul link with respect to the beamformed channel in the uplink child backhaul link and/or the uplink access link (denoted as I_p2c), where the beamformed channel in the uplink child backhaul link and/or uplink access link is generated by or based on the previously determined beamforming directions, e.g. those determined at 430. One example of a criterion that can be used for the selection of the beamforming directions in the uplink parent backhaul link is that the uplink beamforming direction can have a maximum value of S_p/I_p2c. If S_p is unknown by relay node 410, the criterion can be the beamforming directions that has a minimum value of I_p2c.

Accordingly, relay node 410 may determine the channel status for each of a plurality of uplink beamforming directions between parent node 405 and relay node 410 based, at least in some aspects, on the uplink beamforming direction between the relay node 410 and child node 415 and/or between relay node 410 and UE 420.

At 450, parent node 405 may determine one or more beamforming directions and/or one or more radio resource allocations for the non-full duplex mode and for the full duplex mode, respectively. In some aspects, parent node 405 may determine the beamforming directions and a radio resource allocations for the full duplex mode and the non-full duplex mode according to the techniques discussed above with respect to process 300, e.g., at 355 of process 300. In some aspects, the radio resource allocation division between the full duplex mode and the non-full duplex mode may be in the time domain, a frequency domain, or a mixture in the time-frequency domain.

At 455, parent node 405 may transmit (and relay node 410 may monitor for and receive) an uplink grant (or uplink grants) that identifies the determined beamforming directions and/or radio resource allocations and, at least in some aspects, includes a flag indicating whether the beamforming directions/radio resource allocations are for the full duplex mode or for the non-full duplex mode. Accordingly, parent node 405 may transmit an uplink grant for the full duplex mode and for the non-full duplex mode to relay node 410, with the flag in each grant indicating whether the grant is for the non-full duplex mode or for the full duplex mode. In some aspects, the beamforming directions (e.g., the first uplink beamforming direction) may be represented by an SRI (e.g., if the beamformed SRS is sent at 435/440), or TPMI (e.g., if the non-beamformed SRS is sent at 435/440).

At 460, relay node 410 may transmit (and parent node 405 may monitor for and receive) an uplink transmission on the uplink parent backhaul link using a non-full duplex mode resource.

At 465, relay node 410 may transmit (and parent node 405 may monitor for and receive) an uplink transmission on the uplink parent backhaul link using a full duplex mode resource. In some examples, a radio resource division between the full duplex mode and the non-full duplex mode may be in the time domain, the frequency domain, or a mixed time-frequency domain, or the like.

Concurrently with the transmission at 465, at 470 child node 415 may transmit (and relay node 410 may monitor for and receive) an uplink transmission on an uplink child backhaul link using a full duplex mode resource.

Concurrently with the transmissions at 465 and 470, UE 420 may transmit (and relay node 410 may monitor for and receive) an uplink transmission on an uplink access link using a full duplex mode resource. That is, the uplink transmissions at 465, 470, and/or 475, may be full duplex transmissions in that relay node 410 can receive the uplink transmissions from child node 415 and/or UE 420 on their respective links while concurrently performing an uplink transmission to parent node 405 on the uplink parent backhaul link.

Figure 5:
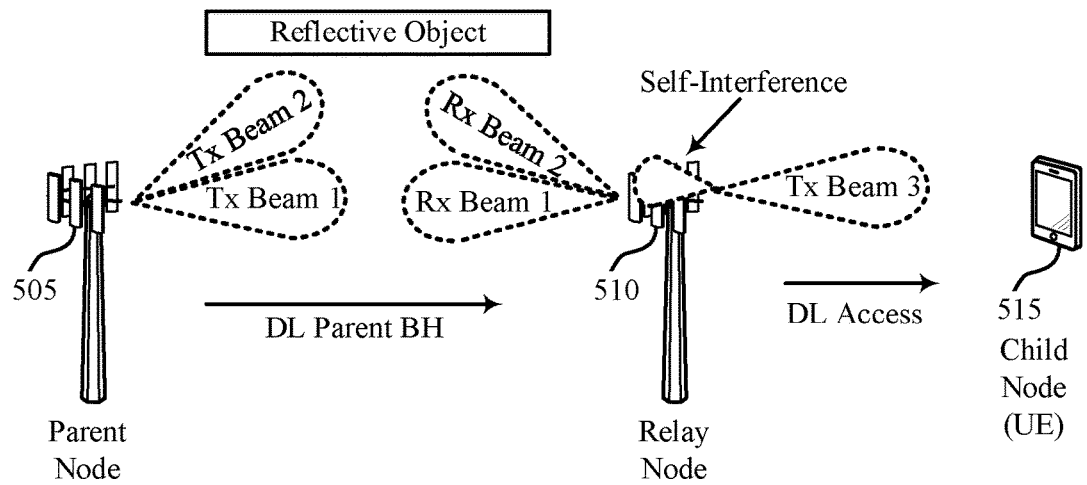
FIG. 5 illustrates an example of a wireless communication system in accordance with aspects of the present disclosure.

FIG. 5 illustrates an example of a wireless communication system 500 that supports beamforming determination for IAB system with full duplex in accordance with aspects of the present disclosure. In some examples, wireless communication system 500 may implement aspects of wireless communication systems 100 and/or 200, and/or processes 300 and/or 400. Aspects of wireless communication system 500 may be implemented by parent node 505, relay node 510, and/or child node 515, which may be examples of the corresponding devices described herein. That is, parent node 505, relay node 510, and/or child node 515 may be examples of nodes within an IAB network, which may be implemented in a base station and/or a UE as described herein. In some examples, child node 515 may be a child node communicating with relay node 510 via an access link (e.g., acting as a UE, e.g., implementing a MT function, from the perspective of relay node 510) or may be an actual UE communicating with relay node 510 via an access link. Broadly, wireless communication system 500 illustrates one example for downlink beamform determination in an IAB network. Broadly, relay node 510 may be configured for, or otherwise support, full duplex mode operations.

In some aspects, parent node 505 (which may be an example of a donor/anchor node or an upstream relay node from the perspective of relay node 510) may use transmit (Tx) beam 1 or transmit beam 2 in a downlink parent backhaul link for communications with relay node 510. Correspondingly, relay node 510 may use receive (Rx) beam 1 or receive beam 2 for downstream communications with parent node 505. For example, parent node 505 may use transmit beam 1 and relay node 510 may use receive beam 1 for direct or line of sight communications or may use transmit beam 2 and receive beam 2 for indirect communications (e.g., transmit beam 2 may bounce off of a reflective object towards relay node 510). Generally, transmit beam 1/receive beam 1 may have or otherwise achieve a higher beamforming channel gain than transmit beam 2/receive beam 2 without other interference.

Relay node 510 may use the same radio resource allocation for its downlink access link with child node 515 using transmit beam 3. That is, relay node 510 may select the transmit beam 3 since it has a highest channel gain in the downlink access link. However, typically transmit beam 3 may introduce self-interference for receive beam 1/receive beam 2, with transmit beam 3 introducing higher self-interference for receive beam 1 than for receive beam 2.

Accordingly, when relay node 510 determines the beamforming direction of the downlink parent backhaul link for the full duplex mode, it may consider the self-interference from the downlink access link (beamformed by transmit beam 3) to the downlink parent backhaul link (beamformed by receive beam 1 or 2). In this instance, relay node 510 may assume that such self-interference is strong for receive beam 1 and weak for receive beam 2. Therefore, relay node 510 may determine a downlink beamforming direction (e.g., receive beam 2) that can lead to the largest value of beamforming channel gain in the downlink parent backhaul link divided by the self-interference strength. Relay node 510 may assume this determined beam is receive beam 2 because the high beamforming channel gain of receive beam 1 is mitigated by its strong self-interference.

Accordingly, relay node 510 may determine a channel status (e.g., CSI, CRI, etc.) for each of the plurality of downlink beamforming direction (e.g., receive beam 1 and receive beam 2) between parent node 505 and relay node 510 based, at least in some aspects, on a downlink beamforming direction (e.g., transmit beam 3) between relay node 510 and child node 515. Relay node 510 may transmit a report to parent node 505 indicating at least a subset of the channel statuses (e.g., receive beam 1 and/or receive beam 2) and an indication that the respective downlink beamforming direction of the plurality of downlink beamforming directions corresponds to the respective channel status in the subset of channel statuses. Parent node 505 may transmit a grant to relay node 510 indicating a first downlink beamforming direction (e.g., transmit beam 2 and/or receive beam 2) from the plurality of beamforming directions. The grant may also carry or convey an indication of resources (e.g., radio resource allocations in the time and/or frequency domain) for the corresponding first downlink beamforming direction for a full duplex mode as well as for a non-full duplex mode. Relay node 510 may use this information to monitor for (and receive) a downlink transmission from the parent node 505 based on the grant and in the first downlink beamforming direction (e.g., using receive beam 2).

Figure 6:
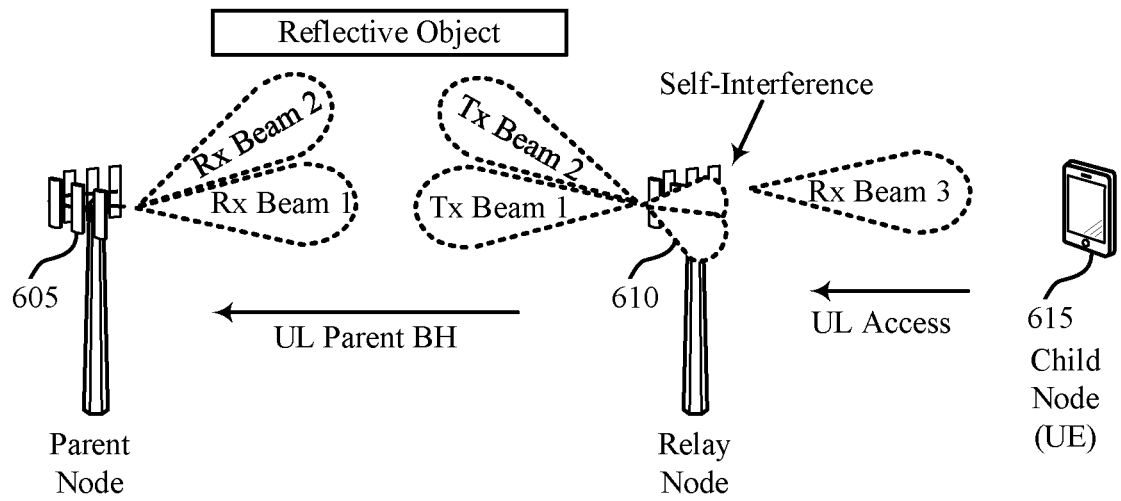
FIG. 6 illustrates an example of a wireless communication system in accordance with aspects of the present disclosure.

FIG. 6 illustrates an example of a wireless communication system 600 that supports beamforming determination for IAB system with full duplex in accordance with aspects of the present disclosure. In some examples, wireless communication system 600 may implement aspects of wireless communication systems 100, 200, and/or 500, and/or processes 300 and/or 400. Aspects of wireless communication system 600 may be implemented by parent node 605, relay node 610, and/or child node 615, which may be examples of corresponding devices described herein. That is, parent node 605, relay node 610, and/or child node 615 may be examples of nodes within an IAB network, which may be implemented in a base station and/or a UE as described herein. In some examples, child node 615 may be a child node communicating with relay node 610 via an access link (e.g., acting as a UE, such as implementing a MT function, from the perspective of relay node 610) or may be an actual UE communicating with relay node 610 via an access link. Broadly, wireless communication system 600 illustrates one example for uplink beamform determination in an IAB network. Broadly, relay node 610 may be configured for, or otherwise support, full duplex mode operations.

In some aspects, parent node 605 (which may be an example of a donor/anchor node or an upstream relay node from the perspective of relay node 610) may use receive beam 1 or receive beam 2 in an uplink parent backhaul link for communications with relay node 610. Correspondingly, relay node 610 may use transmit beam 1 or transmit beam 2 for such communications with parent node 605. For example, relay node 610 may use transmit beam 1 and parent node 605 may use receive beam 1 for direct or line of sight communications or may use transmit beam 2 and receive beam 2, respectively, for indirect communications (e.g., transmit beam 2 may bounce off of a reflective object towards parent node 605). Generally, transmit beam 1/receive beam 1 may have or otherwise achieve a higher beamforming channel gain than transmit beam 2/receive beam 2 without other interference.

Relay node 610 may use the same radio resource allocation for its uplink access link with child node 615 using receive beam 3. That is, relay node 610 may select receive beam 3 since it has a highest channel gain in the uplink access link. However, typically transmit beams 1 and 2 may introduce self-interference for receive beam 3. In some aspects, the self-interference from receive beam 3 may be higher for transmit beam 1 than for transmit beam 2.

Relay node 610 may determine the beamforming direction for the uplink parent backhaul link for the full duplex mode by considering the self-interference from the uplink parent backhaul link (beamformed by transmit beam 1 or transmit beam 2) to the uplink access link (beamformed by receive beam 3). In this case, relay node 610 may assume such self-interference is strong for transmit beam 1 and weak for transmit beam 2. Therefore, if relay node 610 has no information of the beamformed channel gain in the uplink parent backhaul link, it may identify or determine a first uplink beamforming direction (e.g., transmit beam 2) that can lead to the smallest value of the self-interference strength for the full duplex mode.

Accordingly, relay node 610 may determine a channel status for each of a plurality of uplink beamforming directions (e.g., transmit beam 1 and transmit beam 2) between parent node 605 and relay node 610 based, at least in some aspects, on an uplink beamforming direction (e.g., receive beam 3) between relay node 610 and child node 615. Relay node 610 may transmit an uplink reference signal to parent node 605 using at least a subset of the plurality of uplink beamforming directions (e.g., transmit beam 1 and/or transmit beam 2) based, at least in some aspects on the channel statuses.

Parent node 605 may receive the uplink reference signal(s) and transmit a grant to relay node 610 indicating a first uplink beamforming direction (e.g., receive beam 2 and/or transmit beam 2) from the plurality of uplink beamforming directions. Relay node 610 may receive a grant from parent node 605 and transmit, via the first uplink beamforming direction (e.g., transmit beam 2), an uplink transmission to parent node 605 based on the grant. Concurrently, relay node 610 may also receive an uplink transmission from child node 615 using receive beam 3, e.g., for full duplex mode operations.

Figure 7:
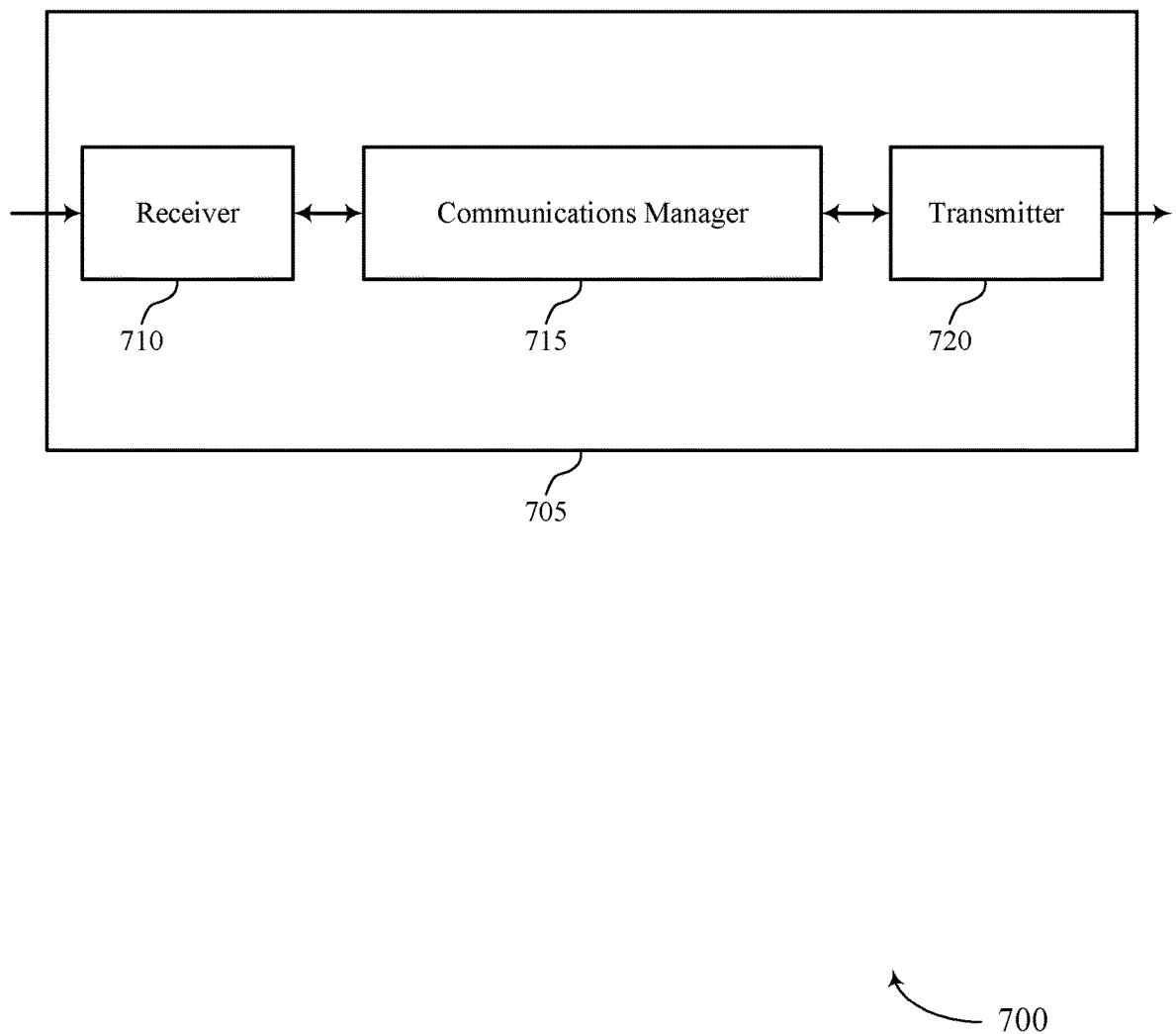
FIGS. 7 and 8 show block diagrams of devices in accordance with aspects of the present disclosure.

FIG. 7 shows a block diagram 700 of a device 705 that supports beamforming determination for IAB system with full duplex in accordance with aspects of the present disclosure. The device 705 may be an example of aspects of a parent node, relay node, child node, UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to beamforming determination for IAB system with full duplex, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable mitigation of self-interference for full duplex transmissions of device 705 that the comprises communications manager 715 in a shared resource. At least one implementation may enable the communications manager 715 to effectively select beamforming directions. At least one implementation may enable communications manager 715 to increase the throughput to device 705 by allowing for reporting of one or more channel statuses and one or more corresponding beamforming directions between the device 705 and a child node to enhance selection of one or more beamforming directions between a parent node and the device 705.

When device 705 is configured as a relay node, the communications manager 715 may determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

When device 705 is configured as a relay node, the communications manager 715 may also determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

When device 705 is configured as a parent node, the communications manager 715 may also receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

When device 705 is configured as a parent node, the communications manager 715 may also receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
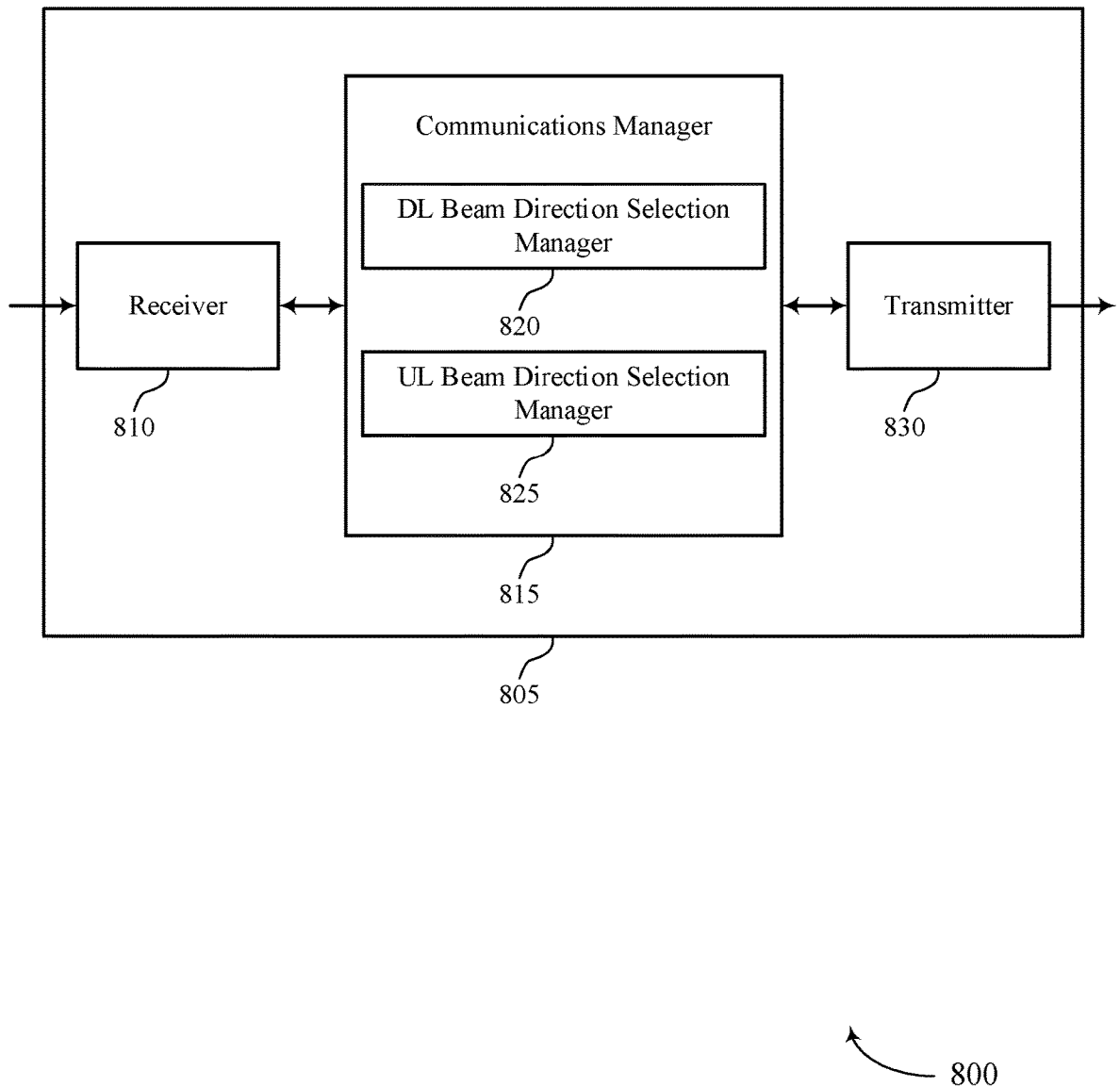

FIG. 8 shows a block diagram 800 of a device 805 that supports beamforming determination for IAB system with full duplex in accordance with aspects of the present disclosure. The device 805 may be an example of aspects of a parent node, relay node, child node, device 705, a UE 115, or a base station 105 as described herein. The device 805 may include a receiver 810, a communications manager 815, and a transmitter 830. The device 805 may also include a processor. Each of these components may be in communication with one another (e.g., via one or more buses).

Receiver 810 may receive information such as packets, user data, or control information associated with various information channels (e.g., control channels, data channels, and information related to beamforming determination for IAB system with full duplex, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a DL beam direction selection manager 820 and an UL beam direction selection manager 825. The communications manager 815 may be an example of aspects of the communications manager 1010 or 1110 as described herein.

The DL beam direction selection manager 820 may determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

The UL beam direction selection manager 825 may determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

The DL beam direction selection manager 820 may receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

The UL beam direction selection manager 825 may receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction.

Transmitter 830 may transmit signals generated by other components of the device 805. In some examples, the transmitter 830 may be collocated with a receiver 810 in a transceiver module. For example, the transmitter 830 may be an example of aspects of the transceiver 1020 or 1120 as described with reference to FIGS. 10 and 11. The transmitter 830 may utilize a single antenna or a set of antennas.

Figure 9:
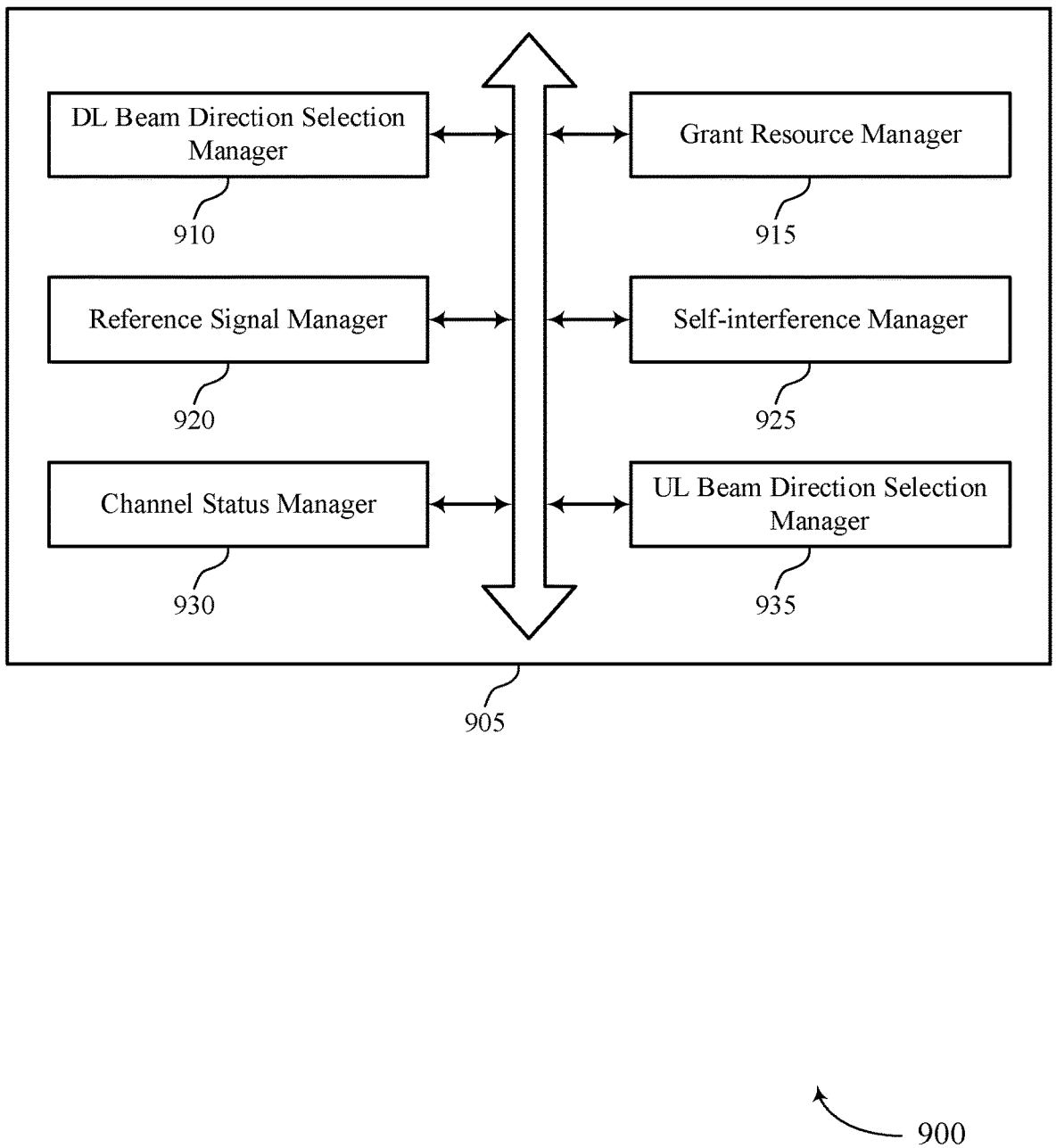
FIG. 9 shows a block diagram of a communications manager in accordance with aspects of the present disclosure.

FIG. 9 shows a block diagram 900 of a communications manager 905 that supports beamforming determination for IAB system with full duplex in accordance with aspects of the present disclosure. The communications manager 905 may be an example of aspects of a communications manager 715, a communications manager 815, or a communications manager 1010 described herein. The communications manager 905 may include a DL beam direction selection manager 910, a grant resource manager 915, a reference signal manager 920, a self-interference manager 925, a channel status manager 930, and an UL beam direction selection manager 935. Each of these modules may communicate, directly or indirectly, with one another (e.g., via one or more buses).

The DL beam direction selection manager 910 may determine a channel status for each of a set of downlink beamforming directions between a parent node and the relay node based on a downlink beamforming direction between the relay node and a child node.

In some examples, the DL beam direction selection manager 910 may transmit a report to the parent node indicating at least a subset of the channel statuses and an indication that a respective downlink beamforming direction of the set of downlink beamforming directions corresponds to a respective channel status in the subset of the channel statuses.

In some examples, the DL beam direction selection manager 910 may receive a grant from the parent node indicating a first downlink beamforming direction from the set of downlink beamforming directions.

In some examples, the DL beam direction selection manager 910 may monitor for a downlink transmission from the parent node based on the grant and the first downlink beamforming direction.

In some examples, the DL beam direction selection manager 910 may receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node.

In some examples, the DL beam direction selection manager 910 may transmit a grant to the relay node indicating a first downlink beamforming direction from the set of downlink beamforming directions based on the report.

In some examples, the DL beam direction selection manager 910 may transmit a downlink transmission to the relay node based on the grant and the first downlink beamforming direction. In some cases, the child node is a UE or a second relay node. In some cases, the relay node includes a relay node within an IAB network. In some cases, the child node includes a UE or a second relay node. In some cases, the parent node includes a parent relay node within an IAB network.

The UL beam direction selection manager 935 may determine a channel status for each of a set of uplink beamforming directions between a parent node and the relay node based on an uplink beamforming direction between the relay node and a child node.

In some examples, the UL beam direction selection manager 935 may transmit an uplink reference signal to the parent node using at least a subset of the set of uplink beamforming directions based on the channel statuses.

In some examples, the UL beam direction selection manager 935 may receive a grant from the parent node indicating a first uplink beamforming direction from the set of uplink beamforming directions.

In some examples, the UL beam direction selection manager 935 may transmit, via the first uplink beamforming direction, an uplink transmission to the parent node based on the grant.

In some examples, the UL beam direction selection manager 935 may receive an uplink reference signal from a relay node transmitted using a subset of a set of uplink beamforming directions.

In some examples, the UL beam direction selection manager 935 may transmit a grant to the relay node indicating a first uplink beamforming direction from the set of uplink beamforming directions based on the uplink reference signal.

In some examples, the UL beam direction selection manager 935 may monitor for an uplink transmission from the relay node based on the grant and the first uplink beamforming direction.

The grant resource manager 915 may receive the grant indicating a resource allocation for simultaneous transmission and reception by the relay node when operating in a full duplex mode.

In some examples, the grant resource manager 915 may receive the downlink transmission from the parent node within the resource allocation.

In some examples, the grant resource manager 915 may transmit a second downlink transmission to the child node within the resource allocation via the downlink beamforming direction between the relay node and the child node.

In some examples, the grant resource manager 915 may receive the grant indicating a resource allocation for simultaneous transmission and reception by the relay node when operating in a full duplex mode.

In some examples, the grant resource manager 915 may transmit the uplink transmission to the parent node within the resource allocation, the method further including.

In some examples, the grant resource manager 915 may transmit the grant indicating a resource allocation for simultaneous transmission and reception by the relay node when operating in a full duplex mode.

In some examples, the grant resource manager 915 may transmit the downlink transmission from the parent node within the resource allocation.

In some examples, the grant resource manager 915 may select the first downlink beamforming direction from the set of downlink beamforming directions for the resource allocation based on the report.

In some examples, the grant resource manager 915 may transmit the grant to identify, for a non-full duplex mode, a second downlink beamforming direction for non-full duplex transmissions from the parent node.

In some examples, the grant resource manager 915 may transmit the grant to identify, for a full duplex mode, the first downlink beamforming direction for the full duplex mode for full duplex communications between the parent node and the relay node, for full duplex communications between the relay node and the child node, or a combination thereof.

In some examples, the grant resource manager 915 may transmit the grant indicating a resource allocation for simultaneous transmission and reception by the relay node when operating in a full duplex mode.

In some examples, the grant resource manager 915 may receive the uplink transmission from the relay node within the resource allocation.

In some examples, the grant resource manager 915 may select the first uplink beamforming direction from the set of uplink beamforming directions for the resource allocation based on the uplink reference signal.

The reference signal manager 920 may communicate a reference signal or a synchronization signal with the child node, where the downlink beamforming direction between the relay node and the child node is identified based on the communicating.

In some examples, the reference signal manager 920 may communicate a reference signal or a synchronization signal with the child node, where the uplink beamforming direction between the relay node and the child node is identified based on the communicating.

In some examples, the reference signal manager 920 may transmit, for a non-full duplex mode, a first uplink reference signal to the parent node.

In some examples, the reference signal manager 920 may transmit, for a full duplex mode, a second uplink reference signal to the parent node, where the grant indicating the first uplink beamforming direction is based on the first uplink reference signal and the second uplink reference signal.

In some examples, the reference signal manager 920 may transmit a signal to the parent node identifying the first uplink reference signal for the non-full duplex mode and the second uplink reference signal for the full duplex mode.

In some examples, the reference signal manager 920 may transmit the first uplink reference signal within a first resource associated with the non-full duplex mode.

In some examples, the reference signal manager 920 may transmit the second uplink reference signal within a second resource associated with the full duplex mode.

In some examples, the reference signal manager 920 may determine, based on the grant, a non-full duplex mode uplink beamforming direction for non-full duplex transmissions to the parent node.

In some examples, the reference signal manager 920 may determine, based on the grant, a full duplex uplink beamforming direction for a full duplex mode for full duplex communications between the parent node and the relay node, for full duplex communications between the relay node and the child node, or a combination thereof.

In some examples, the reference signal manager 920 may receive, for a non-full duplex mode, a first uplink reference signal from the relay node.

In some examples, the reference signal manager 920 may receive, for a full duplex mode, a second uplink reference signal from the relay node, where the grant indicating the first uplink beamforming direction is based on the first uplink reference signal and the second uplink reference signal.

In some examples, the reference signal manager 920 may receive a signal from the relay node identifying the first uplink reference signal for the non-full duplex mode and the second uplink reference signal for the full duplex mode.

In some examples, the reference signal manager 920 may receive the first uplink reference signal via a first resource associated with the non-full duplex mode.

In some examples, the reference signal manager 920 may receive the second uplink reference signal via a second resource associated with the full duplex mode.

The self-interference manager 925 may identify a self-interference level between each downlink beamforming direction in the set of downlink beamforming directions between the parent node and the relay node and the downlink beamforming direction between the relay node and the child node.

In some examples, the self-interference manager 925 may determine, for a full duplex mode, the channel status for each of the set of downlink beamforming directions between the parent node and the relay node based on the identified self-interference levels.

In some examples, the self-interference manager 925 may identify a self-interference level between each beamforming direction in the set of uplink beamforming directions between the parent node and the relay node and the uplink beamforming direction between the relay node and the child node.

In some examples, the self-interference manager 925 may determine, for a full duplex mode, the channel status for each of a set of uplink beamforming directions between the parent node and the relay node based on the identified self-interference levels.

The channel status manager 930 may determine, for a non-full duplex mode, a first channel status for each of the set of downlink beamforming directions between the parent node and the relay node.

In some examples, the channel status manager 930 may determine, for a full duplex mode, a second channel status for each of the set of downlink beamforming directions between the parent node and the relay node, where the report indicating the subset of the channel statuses is based on the first and second channel statuses.

In some examples, the channel status manager 930 may determine a beamforming channel gain for each of the set of downlink beamforming directions between the parent node and the relay node, where the first channel status for each of the set of downlink beamforming directions between the parent node and the relay node is determined based on the beamforming channel gain for each of the set of downlink beamforming directions between the parent node and the relay node.

In some examples, the channel status manager 930 may determine a ratio of beamforming channel gain over self-interference level for each of the set of downlink beamforming directions between the parent node and the relay node based on the identified self-interference levels and the determined beamforming channel gains, where the second channel status for each of the set of downlink beamforming directions between the parent node and the relay node is determined based on the ratio.

In some examples, the channel status manager 930 may determine, based on the grant, a non-full duplex mode downlink beamforming direction for non-full duplex transmissions from the parent node.

In some examples, the channel status manager 930 may determine, based on the grant, a full duplex downlink beamforming direction for full duplex mode for full duplex communications between the parent node and the relay node, for full duplex communications between the relay node and the child node, or a combination thereof.

Figure 10:
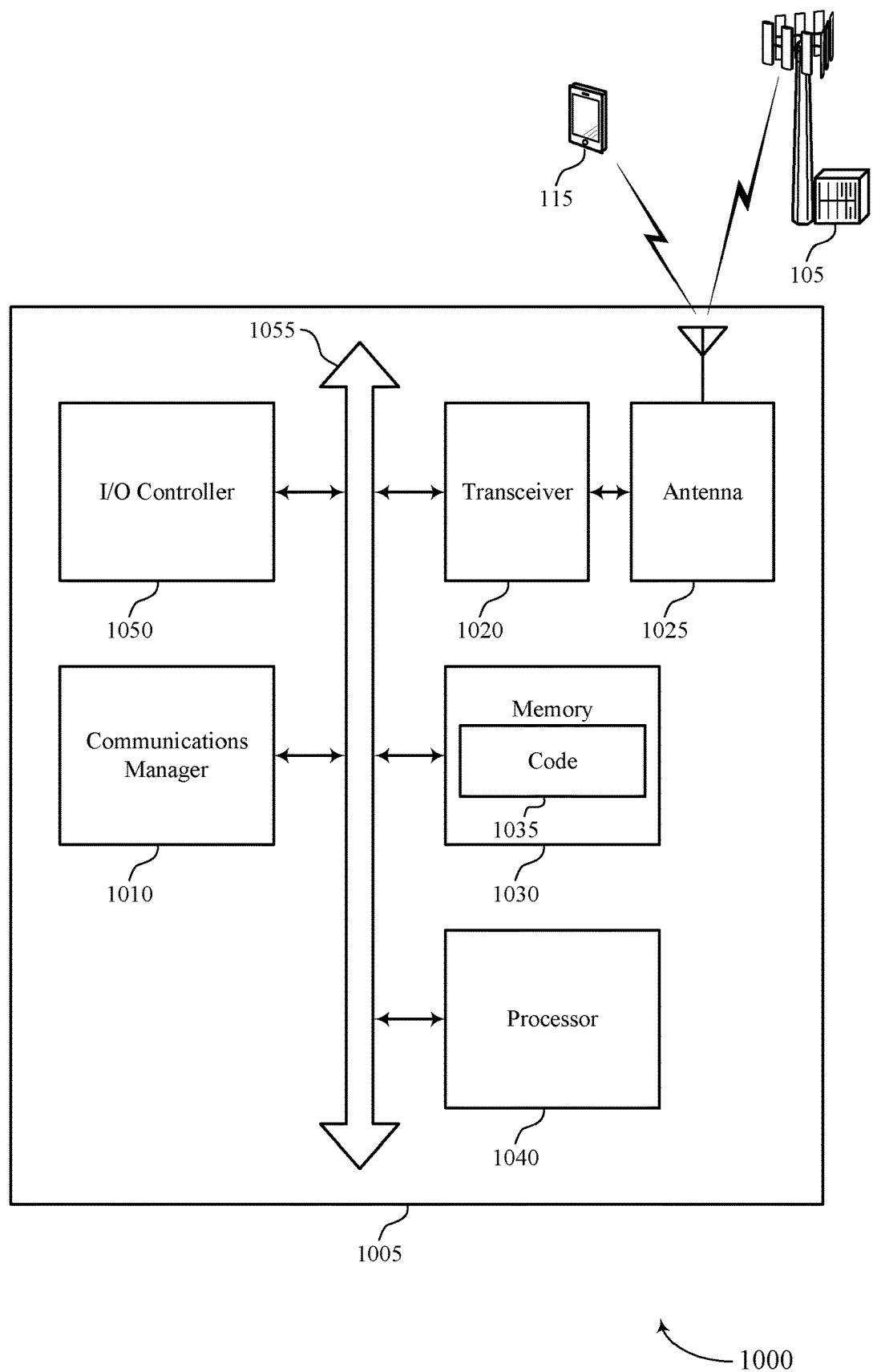
FIG. 10 shows a diagram of a system including a user equipment (UE) in accordance with aspects of the present disclosure.

FIG. 10 shows a diagram of a system 1000 including a device 1005 that supports beamforming determination for IAB system with full duplex in accordance with aspects of the present disclosure. The device 1005 may be an example of or include the components of a parent node, relay node, child node, device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

The communications manager 1010 may also determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

The communications manager 1010 may also receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

The communications manager 1010 may also receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beamforming determination for IAB system with full duplex).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WIN-DOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
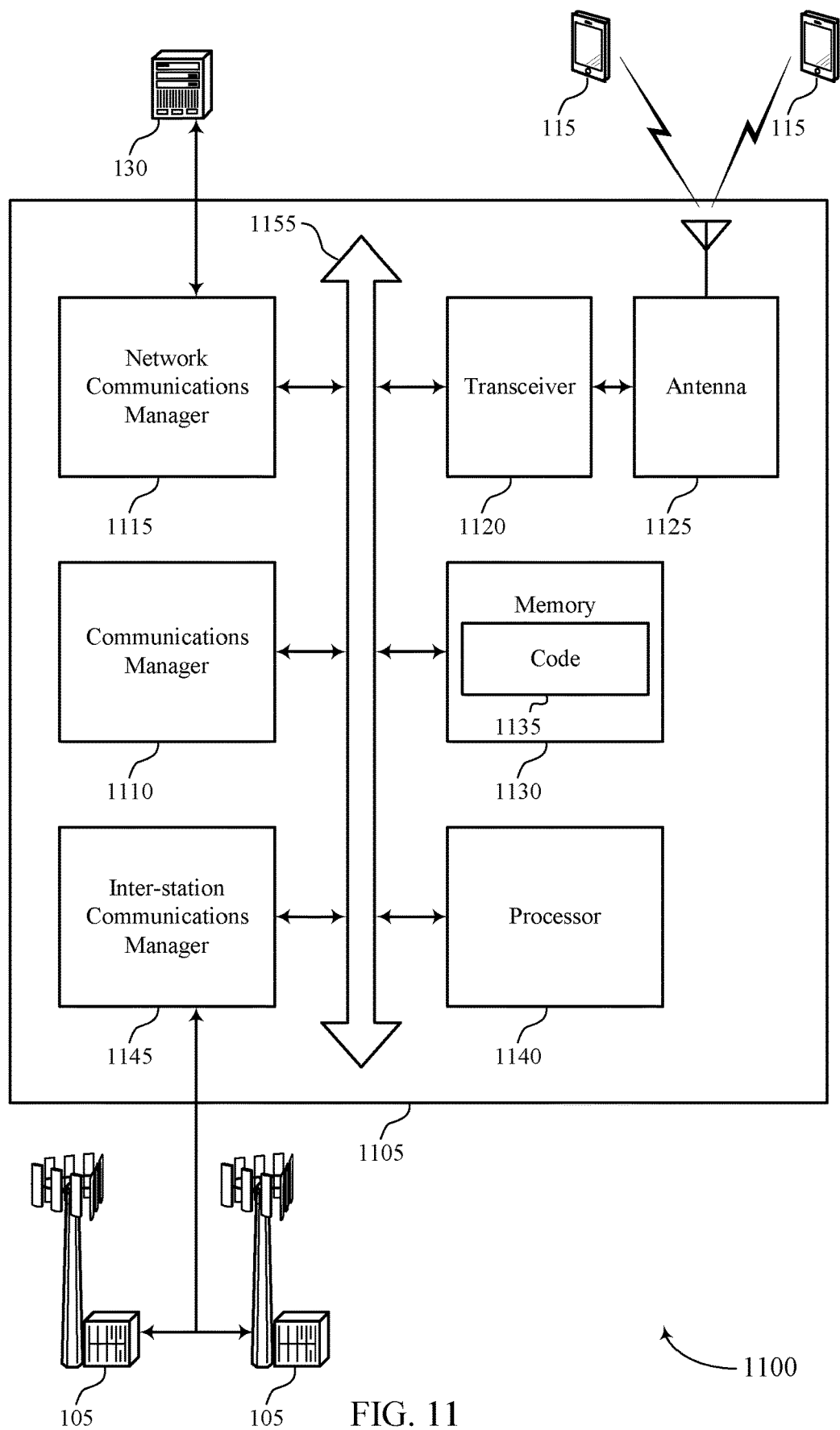
FIG. 11 shows a diagram of a system including a base station in accordance with aspects of the present disclosure.

FIG. 11 shows a diagram of a system 1100 including a device 1105 that supports beamforming determination for IAB system with full duplex in accordance with aspects of the present disclosure. The device 1105 may be an example of or include the components of device 705, device 805, a parent node, a relay node, a child node, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may determine a channel status for each of a set of downlink beamforming directions between a parent node and the relay node based on a downlink beamforming direction between the relay node and a child node, transmit a report to the parent node indicating at least a subset of the channel statuses and an indication that a respective downlink beamforming direction of the set of downlink beamforming directions corresponds to a respective channel status in the subset of the channel statuses, receive a grant from the parent node indicating a first downlink beamforming direction from the set of downlink beamforming directions, and monitor for a downlink transmission from the parent node based on the grant and the first downlink beamforming direction.

The communications manager 1110 may also determine a channel status for each of a set of uplink beamforming directions between a parent node and the relay node based on an uplink beamforming direction between the relay node and a child node, transmit an uplink reference signal to the parent node using at least a subset of the set of uplink beamforming directions based on the channel statuses, receive a grant from the parent node indicating a first uplink beamforming direction from the set of uplink beamforming directions, and transmit, via the first uplink beamforming direction, an uplink transmission to the parent node based on the grant.

The communications manager 1110 may also receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node, transmit a grant to the relay node indicating a first downlink beamforming direction from the set of downlink beamforming directions based on the report, and transmit a downlink transmission to the relay node based on the grant and the first downlink beamforming direction.

The communications manager 1110 may also receive an uplink reference signal from a relay node transmitted using a subset of a set of uplink beamforming directions, transmit a grant to the relay node indicating a first uplink beamforming direction from the set of uplink beamforming directions based on the uplink reference signal, and monitor for an uplink transmission from the relay node based on the grant and the first uplink beamforming direction.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beamforming determination for IAB system with full duplex).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
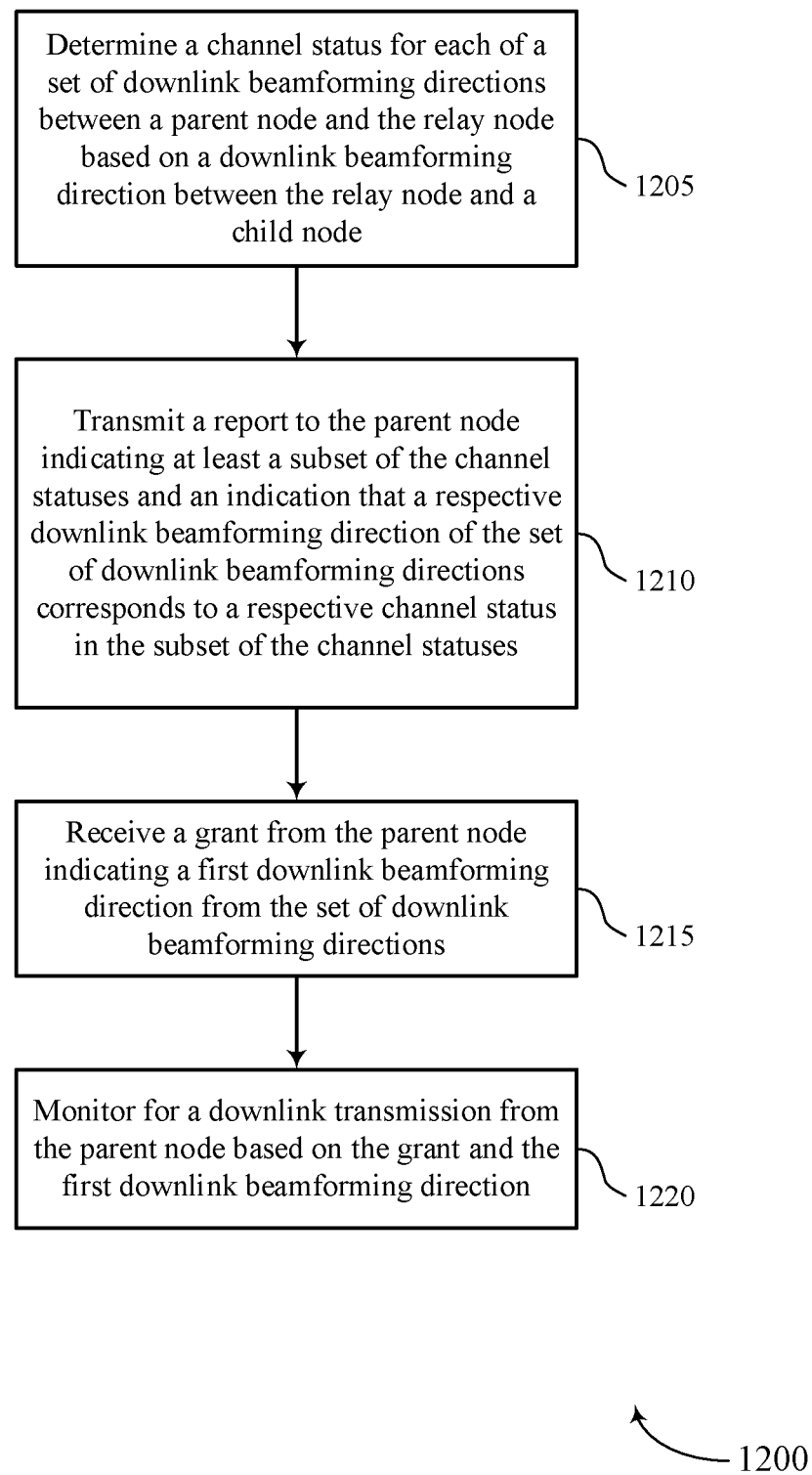
FIGS. 12 through 16 show flowcharts illustrating methods in accordance with aspects of the present disclosure.

FIG. 12 shows a flowchart illustrating a method 1200 that supports beamforming determination for IAB system with full duplex in accordance with aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may determine a channel status for each of a set of downlink beamforming directions between a parent node and the relay node based on a downlink beamforming direction between the relay node and a child node. The operations of 1205 may be performed according to the methods described herein. In some examples, aspects of the operations of 1205 may be performed by a DL beam direction selection manager as described with reference to FIGS. 7 through 11.

At 1210, the UE or base station may transmit a report to the parent node indicating at least a subset of the channel statuses and an indication that a respective downlink beamforming direction of the set of downlink beamforming directions corresponds to a respective channel status in the subset of the channel statuses. The operations of 1210 may be performed according to the methods described herein. In some examples, aspects of the operations of 1210 may be performed by a DL beam direction selection manager as described with reference to FIGS. 7 through 11.

At 1215, the UE or base station may receive a grant from the parent node indicating a first downlink beamforming direction from the set of downlink beamforming directions. The operations of 1215 may be performed according to the methods described herein. In some examples, aspects of the operations of 1215 may be performed by a DL beam direction selection manager as described with reference to FIGS. 7 through 11.

At 1220, the UE or base station may monitor for a downlink transmission from the parent node based on the grant and the first downlink beamforming direction. The operations of 1220 may be performed according to the methods described herein. In some examples, aspects of the operations of 1220 may be performed by a DL beam direction selection manager as described with reference to FIGS. 7 through 11.

Figure 13:
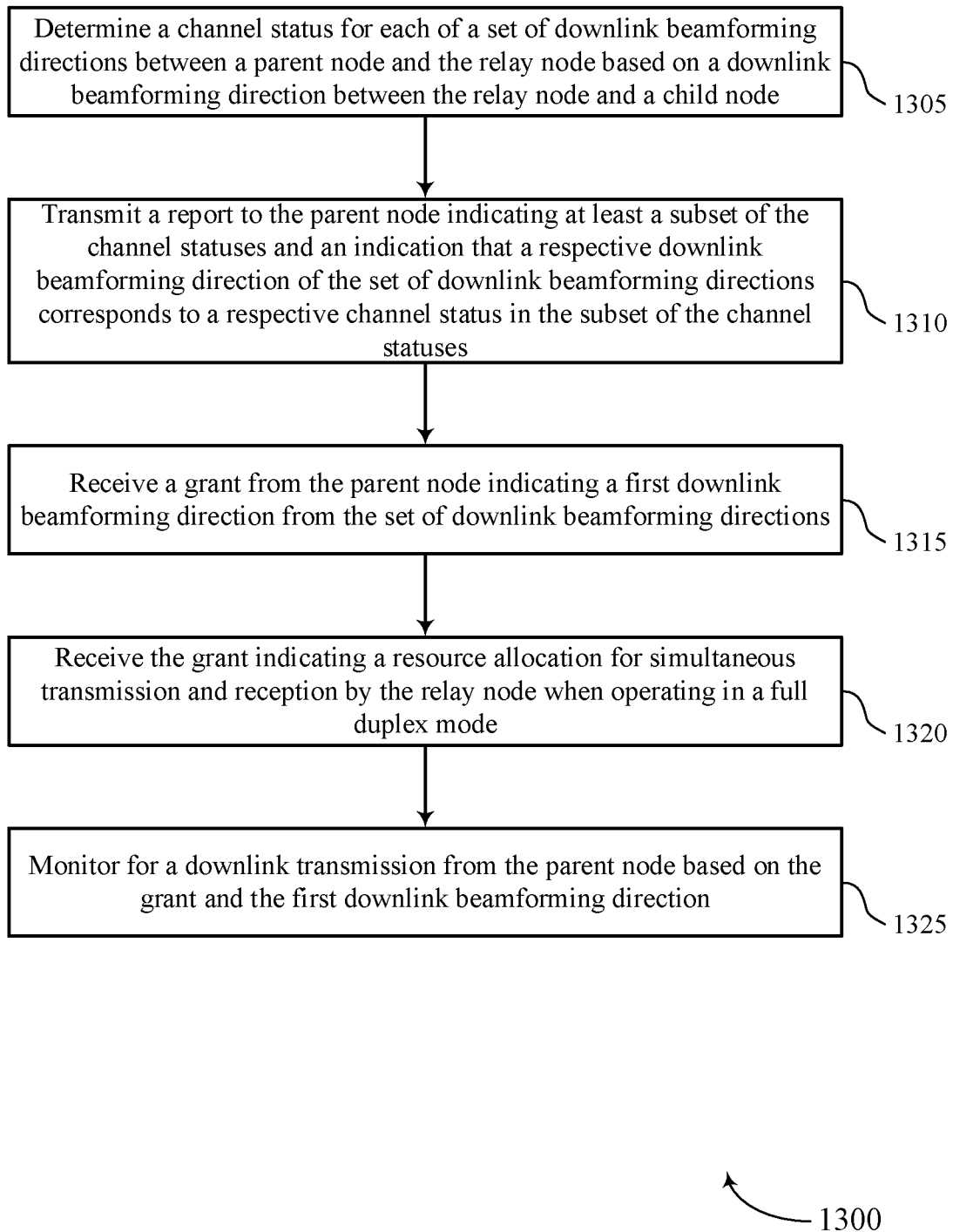

FIG. 13 shows a flowchart illustrating a method 1300 that supports beamforming determination for IAB system with full duplex in accordance with aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may determine a channel status for each of a set of downlink beamforming directions between a parent node and the relay node based on a downlink beamforming direction between the relay node and a child node. The operations of 1305 may be performed according to the methods described herein. In some examples, aspects of the operations of 1305 may be performed by a DL beam direction selection manager as described with reference to FIGS. 7 through 11.

At 1310, the UE or base station may transmit a report to the parent node indicating at least a subset of the channel statuses and an indication that a respective downlink beamforming direction of the set of downlink beamforming directions corresponds to a respective channel status in the subset of the channel statuses. The operations of 1310 may be performed according to the methods described herein. In some examples, aspects of the operations of 1310 may be performed by a DL beam direction selection manager as described with reference to FIGS. 7 through 11.

At 1315, the UE or base station may receive a grant from the parent node indicating a first downlink beamforming direction from the set of downlink beamforming directions. The operations of 1315 may be performed according to the methods described herein. In some examples, aspects of the operations of 1315 may be performed by a DL beam direction selection manager as described with reference to FIGS. 7 through 11.

At 1320, the UE or base station may receive the grant indicating a resource allocation for simultaneous transmission and reception by the relay node when operating in a full duplex mode. The operations of 1320 may be performed according to the methods described herein. In some examples, aspects of the operations of 1320 may be performed by a grant resource manager as described with reference to FIGS. 7 through 11.

At 1325, the UE or base station may monitor for a downlink transmission from the parent node based on the grant and the first downlink beamforming direction. The operations of 1325 may be performed according to the methods described herein. In some examples, aspects of the operations of 1325 may be performed by a DL beam direction selection manager as described with reference to FIGS. 7 through 11.

Figure 14:
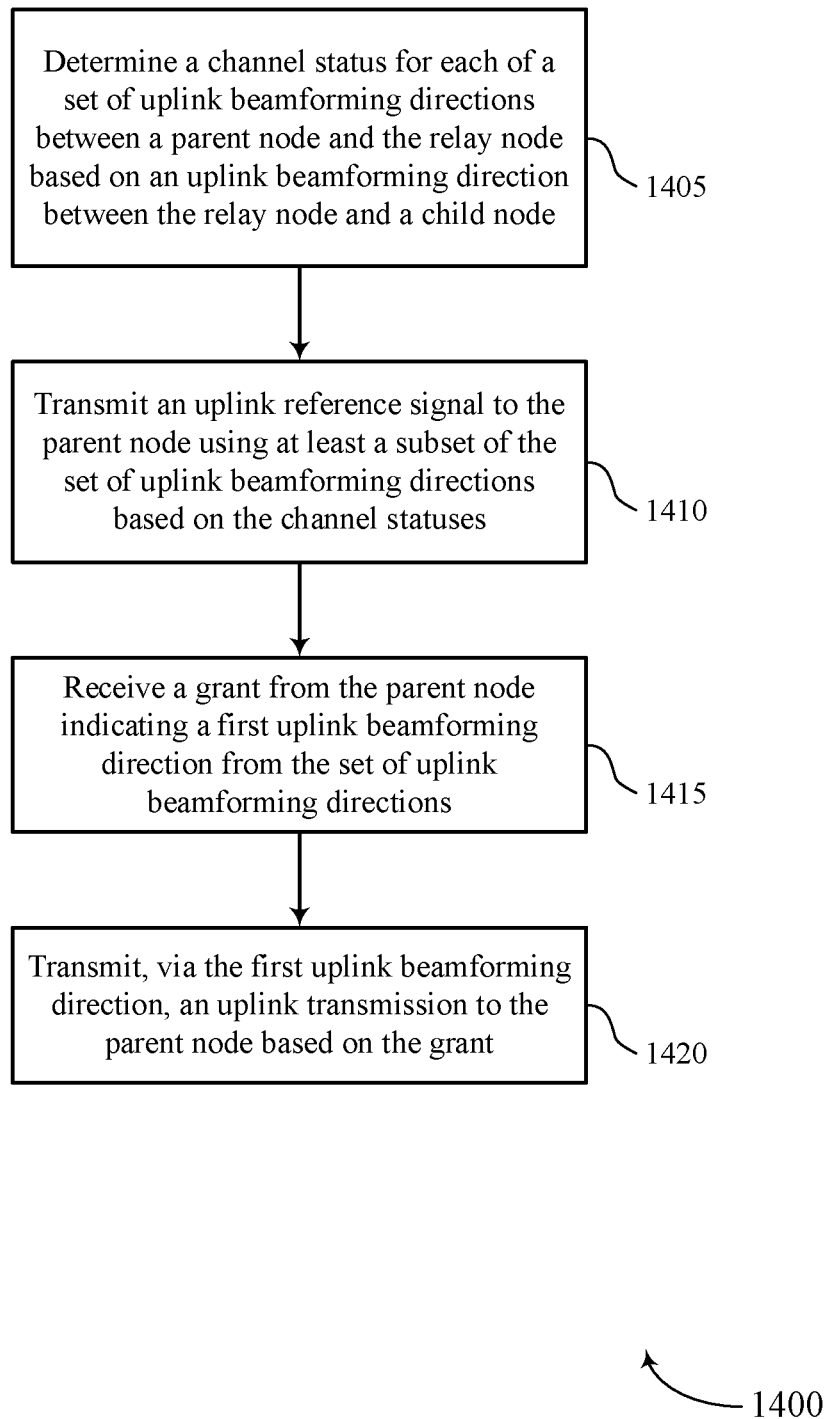

FIG. 14 shows a flowchart illustrating a method 1400 that supports beamforming determination for IAB system with full duplex in accordance with aspects of the present disclosure. The operations of method 1400 may be implemented by a UE 115 or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may determine a channel status for each of a set of uplink beamforming directions between a parent node and the relay node based on an uplink beamforming direction between the relay node and a child node. The operations of 1405 may be performed according to the methods described herein. In some examples, aspects of the operations of 1405 may be performed by an UL beam direction selection manager as described with reference to FIGS. 7 through 11.

At 1410, the UE or base station may transmit an uplink reference signal to the parent node using at least a subset of the set of uplink beamforming directions based on the channel statuses. The operations of 1410 may be performed according to the methods described herein. In some examples, aspects of the operations of 1410 may be performed by an UL beam direction selection manager as described with reference to FIGS. 7 through 11.

At 1415, the UE or base station may receive a grant from the parent node indicating a first uplink beamforming direction from the set of uplink beamforming directions. The operations of 1415 may be performed according to the methods described herein. In some examples, aspects of the operations of 1415 may be performed by an UL beam direction selection manager as described with reference to FIGS. 7 through 11.

At 1420, the UE or base station may transmit, via the first uplink beamforming direction, an uplink transmission to the parent node based on the grant. The operations of 1420 may be performed according to the methods described herein. In some examples, aspects of the operations of 1420 may be performed by an UL beam direction selection manager as described with reference to FIGS. 7 through 11.

Figure 15:
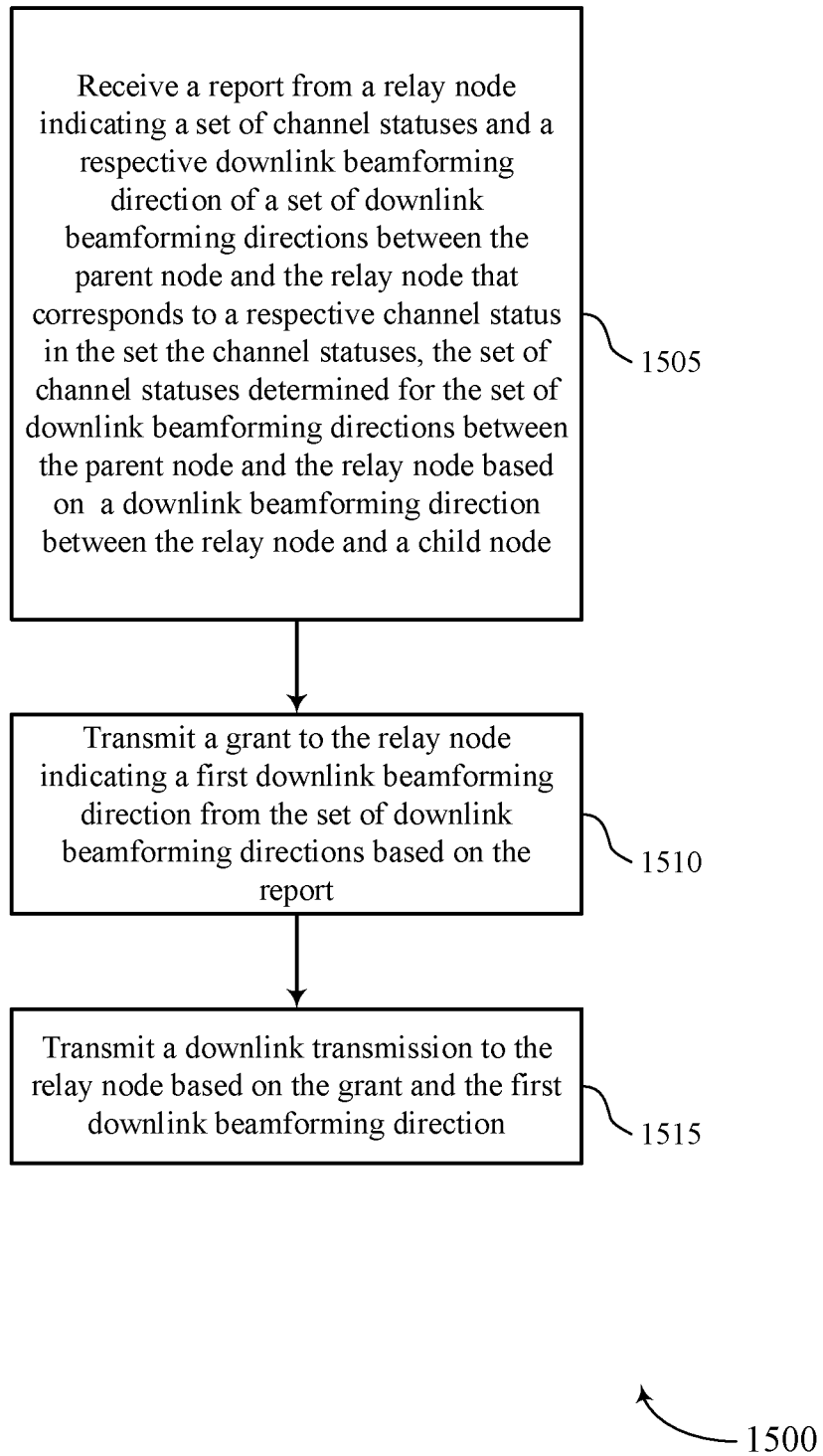

FIG. 15 shows a flowchart illustrating a method 1500 that supports beamforming determination for IAB system with full duplex in accordance with aspects of the present disclosure. The operations of method 1500 may be implemented by a UE 115 or base station 105 or its components as described herein. For example, the operations of method 1500 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive a report from a relay node indicating a set of channel statuses and a respective downlink beamforming direction of a set of downlink beamforming directions between the parent node and the relay node that corresponds to a respective channel status in the set the channel statuses, the set of channel statuses determined for the set of downlink beamforming directions between the parent node and the relay node based on a downlink beamforming direction between the relay node and a child node. The operations of 1505 may be performed according to the methods described herein. In some examples, aspects of the operations of 1505 may be performed by a DL beam direction selection manager as described with reference to FIGS. 7 through 11.

At 1510, the UE or base station may transmit a grant to the relay node indicating a first downlink beamforming direction from the set of downlink beamforming directions based on the report. The operations of 1510 may be performed according to the methods described herein. In some examples, aspects of the operations of 1510 may be performed by a DL beam direction selection manager as described with reference to FIGS. 7 through 11.

At 1515, the UE or base station may transmit a downlink transmission to the relay node based on the grant and the first downlink beamforming direction. The operations of 1515 may be performed according to the methods described herein. In some examples, aspects of the operations of 1515 may be performed by a DL beam direction selection manager as described with reference to FIGS. 7 through 11.

Figure 16:
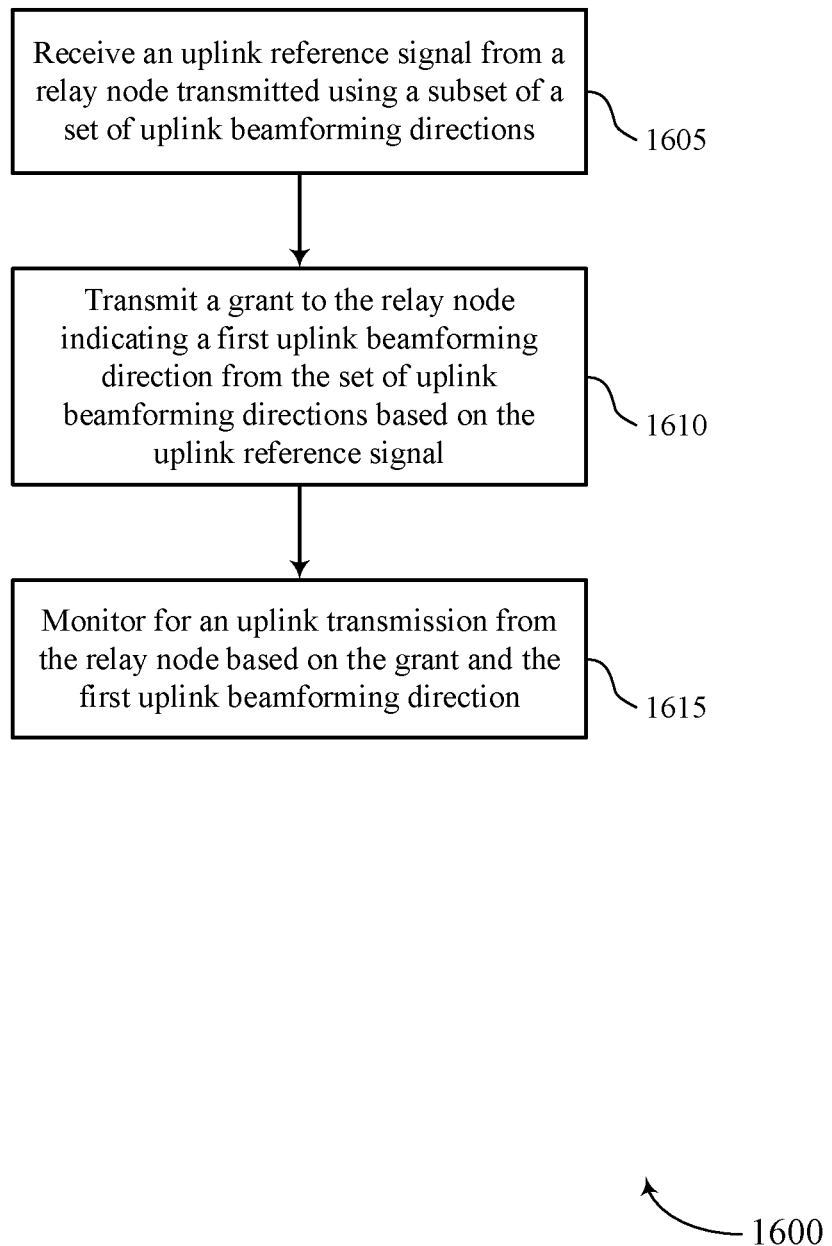

FIG. 16 shows a flowchart illustrating a method 1600 that supports beamforming determination for IAB system with full duplex in accordance with aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive an uplink reference signal from a relay node transmitted using a subset of a set of uplink beamforming directions. The operations of 1605 may be performed according to the methods described herein. In some examples, aspects of the operations of 1605 may be performed by an UL beam direction selection manager as described with reference to FIGS. 7 through 11.

At 1610, the UE or base station may transmit a grant to the relay node indicating a first uplink beamforming direction from the set of uplink beamforming directions based on the uplink reference signal. The operations of 1610 may be performed according to the methods described herein. In some examples, aspects of the operations of 1610 may be performed by an UL beam direction selection manager as described with reference to FIGS. 7 through 11.

At 1615, the UE or base station may monitor for an uplink transmission from the relay node based on the grant and the first uplink beamforming direction. The operations of 1615 may be performed according to the methods described herein. In some examples, aspects of the operations of 1615 may be performed by an UL beam direction selection manager as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay node, comprising:
   determining a channel status for each of a plurality of downlink beamforming directions between a parent node and the relay node based at least in part on a downlink beamforming direction between the relay node and a child node;
   transmitting a report to the parent node indicating at least a subset of the channel statuses and an indication that a respective downlink beamforming direction of the plurality of downlink beamforming directions corresponds to a respective channel status in the subset of the channel statuses;
   receiving a grant from the parent node indicating a first downlink beamforming direction from the plurality of downlink beamforming directions; and
   monitoring for a downlink transmission from the parent node based at least in part on the grant and the first downlink beamforming direction.

2. The method of claim 1, wherein receiving the grant further comprises:
   receiving the grant indicating a resource allocation for simultaneous transmission and reception by the relay node when operating in a full duplex mode.

3. The method of claim 2, further comprising:
   receiving the downlink transmission from the parent node within the resource allocation; and
   transmitting a second downlink transmission to the child node within the resource allocation via the downlink beamforming direction between the relay node and the child node.

4. The method of claim 1, further comprising:
   communicating a reference signal or a synchronization signal with the child node, wherein the downlink beamforming direction between the relay node and the child node is identified based at least in part on the communicating.

5. The method of claim 1, further comprising:
   identifying a self-interference level between each downlink beamforming direction in the plurality of downlink beamforming directions between the parent node and the relay node and the downlink beamforming direction between the relay node and the child node; and
   determining, for a full duplex mode, the channel status for each of the plurality of downlink beamforming directions between the parent node and the relay node based at least in part on the identified self-interference levels.

6. The method of claim 1, wherein determining the channel status for each of the plurality of downlink beamforming directions further comprises:
   determining, for a non-full duplex mode, a first channel status for each of the plurality of downlink beamforming directions between the parent node and the relay node; and
   determining, for a full duplex mode, a second channel status for each of the plurality of downlink beamforming directions between the parent node and the relay node, wherein the report indicating the subset of the channel statuses is based at least in part on the first and second channel statuses.

7. The method of claim 6, wherein determining the channel status for each of the plurality of downlink beamforming directions comprises:
   determining a beamforming channel gain for each of the plurality of downlink beamforming directions between the parent node and the relay node, wherein the first channel status for each of the plurality of downlink beamforming directions between the parent node and the relay node is determined based at least in part on the beamforming channel gain for each of the plurality of downlink beamforming directions between the parent node and the relay node; and
   determining a ratio of beamforming channel gain over self-interference level for each of the plurality of downlink beamforming directions between the parent node and the relay node based at least in part on the identified self-interference levels and the determined beamforming channel gains, wherein the second channel status for each of the plurality of downlink beamforming directions between the parent node and the relay node is determined based at least in part on the ratio.

8. The method of claim 6, further comprising:
   determining, based at least in part on the grant, a non-full duplex mode downlink beamforming direction for non-full duplex transmissions from the parent node; and
   determining, based at least in part on the grant, a full duplex downlink beamforming direction for full duplex mode for full duplex communications between the parent node and the relay node, for full duplex communications between the relay node and the child node, or a combination thereof.

9. The method of claim 1, wherein the child node is a user equipment (UE) or a second relay node.

10. The method of claim 1, wherein the relay node comprises a relay node within an integrated access and backhaul (IAB) network.

11. A method for wireless communication at a relay node, comprising:
    determining a channel status for each of a plurality of uplink beamforming directions between a parent node and the relay node based at least in part on an uplink beamforming direction between the relay node and a child node;
    transmitting an uplink reference signal to the parent node using at least a subset of the plurality of uplink beamforming directions based at least in part on the channel statuses;

receiving a grant from the parent node indicating a first uplink beamforming direction from the plurality of uplink beamforming directions; and transmitting, via the first uplink beamforming direction, an uplink transmission to the parent node based at least in part on the grant.

12. The method of claim 11, wherein receiving the grant comprises:

receiving the grant indicating a resource allocation for simultaneous transmission and reception by the relay node when operating in a full duplex mode.

13. The method of claim 12, wherein transmitting the uplink transmission further comprises:

transmitting the uplink transmission to the parent node within the resource allocation, the method further comprising; and receiving a second uplink transmission from the child node within the resource allocation via the uplink beamforming direction between the relay node and the child node.

14. The method of claim 11, further comprising:

communicating a reference signal or a synchronization signal with the child node, wherein the uplink beamforming direction between the relay node and the child node is identified based at least in part on the communicating.

15. The method of claim 11, further comprising:

identifying a self-interference level between each beamforming direction in the plurality of uplink beamforming directions between the parent node and the relay node and the uplink beamforming direction between the relay node and the child node; and determining, for a full duplex mode, the channel status for each of a plurality of uplink beamforming directions between the parent node and the relay node based at least in part on the identified self-interference levels.

16. The method of claim 11, wherein transmitting the uplink reference signal further comprises:

transmitting, for a non-full duplex mode, a first uplink reference signal to the parent node; and transmitting, for a full duplex mode, a second uplink reference signal to the parent node, wherein the grant indicating the first uplink beamforming direction is based at least in part on the first uplink reference signal and the second uplink reference signal.

17. The method of claim 16, further comprising:

transmitting a signal to the parent node identifying the first uplink reference signal for the non-full duplex mode and the second uplink reference signal for the full duplex mode.

18. The method of claim 16, wherein transmitting the uplink reference signal further comprises:

transmitting the first uplink reference signal within a first resource associated with the non-full duplex mode; and transmitting the second uplink reference signal within a second resource associated with the full duplex mode.

19. The method of claim 16, further comprising:

determining, based at least in part on the grant, a non-full duplex mode uplink beamforming direction for non-full duplex transmissions to the parent node; and determining, based at least in part on the grant, a full duplex uplink beamforming direction for a full duplex mode for full duplex communications between the parent node and the relay node, for full duplex communications between the relay node and the child node, or a combination thereof.

20. The method of claim 11, wherein the relay node comprises a relay node within an integrated access and backhaul (IAB) network.

21. A method for wireless communications at a parent node, comprising:

receiving a report from a relay node indicating a set of channel statuses and a respective downlink beamforming direction of a plurality of downlink beamforming directions between the parent node and the relay node that corresponds to a respective channel status in the set the channel statuses, the set of channel statuses determined for the plurality of downlink beamforming directions between the parent node and the relay node based at least in part on a downlink beamforming direction between the relay node and a child node;

transmitting a grant to the relay node indicating a first downlink beamforming direction from the plurality of downlink beamforming directions based at least in part on the report; and transmitting a downlink transmission to the relay node based at least in part on the grant and the first downlink beamforming direction.

22. The method of claim 21, wherein transmitting the grant further comprises:

transmitting the grant indicating a resource allocation for simultaneous transmission and reception by the relay node when operating in a full duplex mode.

23. The method of claim 22, further comprising:

transmitting the downlink transmission from the parent node within the resource allocation.

24. The method of claim 22, further comprising:

selecting the first downlink beamforming direction from the plurality of downlink beamforming directions for the resource allocation based at least in part on the report.

25. The method of claim 21, wherein transmitting the grant comprises:

transmitting the grant to identify, for a non-full duplex mode, a second downlink beamforming direction for non-full duplex transmissions from the parent node; and transmitting the grant to identify, for a full duplex mode, the first downlink beamforming direction for the full duplex mode for full duplex communications between the parent node and the relay node, for full duplex communications between the relay node and the child node, or a combination thereof.

26. The method of claim 21, wherein the child node comprises a user equipment (UE) or a second relay node.

27. The method of claim 21, wherein the parent node comprises a parent relay node within an integrated access and backhaul (IAB) network.

28. A method for wireless communications at a parent node, comprising:

receiving an uplink reference signal from a relay node transmitted using a subset of a plurality of uplink beamforming directions;

transmitting a grant to the relay node indicating a first uplink beamforming direction from the plurality of uplink beamforming directions based at least in part on the uplink reference signal; and monitoring for an uplink transmission from the relay node based at least in part on the grant and the first uplink beamforming direction.

29. The method of claim 28, wherein transmitting the grant comprises:
  transmitting the grant indicating a resource allocation for simultaneous transmission and reception by the relay node when operating in a full duplex mode.

30. The method of claim 29, further comprising:
  receiving the uplink transmission from the relay node within the resource allocation.

31. The method of claim 29, further comprising:
  selecting the first uplink beamforming direction from the plurality of uplink beamforming directions for the resource allocation based at least in part on the uplink reference signal.

32. The method of claim 28, wherein receiving the uplink reference signal comprises:
  receiving, for a non-full duplex mode, a first uplink reference signal from the relay node; and
  receiving, for a full duplex mode, a second uplink reference signal from the relay node, wherein the grant indicating the first uplink beamforming direction is based at least in part on the first uplink reference signal and the second uplink reference signal.

33. The method of claim 32, further comprising:
  receiving a signal from the relay node identifying the first uplink reference signal for the non-full duplex mode and the second uplink reference signal for the full duplex mode.

34. The method of claim 32, further comprising:
  receiving the first uplink reference signal via a first resource associated with the non-full duplex mode; and
  receiving the second uplink reference signal via a second resource associated with the full duplex mode.

35. The method of claim 28, wherein the parent node comprises a parent node within an integrated access and backhaul (IAB) network.

36. An apparatus for wireless communication at a relay node, comprising:
  a processor,
  memory coupled with the processor; and
  instructions stored in the memory and executable by the processor to cause the apparatus to:
    determine a channel status for each of a plurality of downlink beamforming directions between a parent node and the relay node based at least in part on a downlink beamforming direction between the relay node and a child node;
    transmit a report to the parent node indicating at least a subset of the channel statuses and an indication that a respective downlink beamforming direction of the plurality of downlink beamforming directions corresponds to a respective channel status in the subset of the channel statuses;
    receive a grant from the parent node indicating a first downlink beamforming direction from the plurality of downlink beamforming directions; and
    monitor for a downlink transmission from the parent node based at least in part on the grant and the first downlink beamforming direction.

37. The apparatus of claim 36, further comprising a receiver, wherein the instructions to receive the grant further are executable by the processor to cause the apparatus to:
  receive, via the receiver, the grant indicating a resource allocation for simultaneous transmission and reception by the relay node when operating in a full duplex mode.

38. The apparatus of claim 37, wherein the instructions are further executable by the processor to cause the apparatus to:
  receive the downlink transmission from the parent node within the resource allocation; and
  transmit a second downlink transmission to the child node within the resource allocation via the downlink beamforming direction between the relay node and the child node.

39. The apparatus of claim 36, wherein the instructions are further executable by the processor to cause the apparatus to:
  communicate a reference signal or a synchronization signal with the child node, wherein the downlink beamforming direction between the relay node and the child node is identified based at least in part on the communicating.

40. The apparatus of claim 36, wherein the instructions are further executable by the processor to cause the apparatus to:
  identify a self-interference level between each downlink beamforming direction in the plurality of downlink beamforming directions between the parent node and the relay node and the downlink beamforming direction between the relay node and the child node; and
  determine, for a full duplex mode, the channel status for each of the plurality of downlink beamforming directions between the parent node and the relay node based at least in part on the identified self-interference levels.

41. The apparatus of claim 36, wherein the instructions to determine the channel status for each of the plurality of downlink beamforming directions further are executable by the processor to cause the apparatus to:
  determine, for a non-full duplex mode, a first channel status for each of the plurality of downlink beamforming directions between the parent node and the relay node; and
  determine, for a full duplex mode, a second channel status for each of the plurality of downlink beamforming directions between the parent node and the relay node, wherein the report indicating the subset of the channel statuses is based at least in part on the first and second channel statuses.

42. The apparatus of claim 41, wherein the instructions to determine the channel status for each of the plurality of downlink beamforming directions are executable by the processor to cause the apparatus to:
  determine a beamforming channel gain for each of the plurality of downlink beamforming directions between the parent node and the relay node, wherein the first channel status for each of the plurality of downlink beamforming directions between the parent node and the relay node is determined based at least in part on the beamforming channel gain for each of the plurality of downlink beamforming directions between the parent node and the relay node; and
  determine a ratio of beamforming channel gain over self-interference level for each of the plurality of downlink beamforming directions between the parent node and the relay node based at least in part on the identified self-interference levels and the determined beamforming channel gains, wherein the second channel status for each of the plurality of downlink beamforming directions between the parent node and the relay node is determined based at least in part on the ratio.

43. The apparatus of claim 41, wherein the instructions are further executable by the processor to cause the apparatus to:
- determine, based at least in part on the grant, a non-full duplex mode downlink beamforming direction for non-full duplex transmissions from the parent node; and
- determine, based at least in part on the grant, a full duplex downlink beamforming direction for full duplex mode for full duplex communications between the parent node and the relay node, for full duplex communications between the relay node and the child node, or a combination thereof.

44. The apparatus of claim 36, wherein the child node is a user equipment (UE) or a second relay node.

45. The apparatus of claim 36, wherein the relay node comprises a relay node within an integrated access and backhaul (IAB) network.

46. An apparatus for wireless communication at a relay node, comprising:
- a processor,
- memory coupled with the processor; and
- instructions stored in the memory and executable by the processor to cause the apparatus to:
  - determine a channel status for each of a plurality of uplink beamforming directions between a parent node and the relay node based at least in part on an uplink beamforming direction between the relay node and a child node;
  - transmit an uplink reference signal to the parent node using at least a subset of the plurality of uplink beamforming directions based at least in part on the channel statuses;
  - receive a grant from the parent node indicating a first uplink beamforming direction from the plurality of uplink beamforming directions; and
  - transmit, via the first uplink beamforming direction, an uplink transmission to the parent node based at least in part on the grant.

47. The apparatus of claim 46, wherein the instructions to receive the grant are executable by the processor to cause the apparatus to:
- receive the grant indicating a resource allocation for simultaneous transmission and reception by the relay node when operating in a full duplex mode.

48. The apparatus of claim 47, wherein the instructions to transmit the uplink transmission further are executable by the processor to cause the apparatus to:
- transmit the uplink transmission to the parent node within the resource allocation.

49. The apparatus of claim 46, wherein the instructions are further executable by the processor to cause the apparatus to:
- communicate a reference signal or a synchronization signal with the child node, wherein the uplink beamforming direction between the relay node and the child node is identified based at least in part on the communicating.

50. The apparatus of claim 46, wherein the instructions are further executable by the processor to cause the apparatus to:
- identify a self-interference level between each beamforming direction in the plurality of uplink beamforming directions between the parent node and the relay node and the uplink beamforming direction between the relay node and the child node; and
- determine, for a full duplex mode, the channel status for each of a plurality of uplink beamforming directions between the parent node and the relay node based at least in part on the identified self-interference levels.

51. The apparatus of claim 46, wherein the instructions to transmit the uplink reference signal further are executable by the processor to cause the apparatus to:
- transmit, for a non-full duplex mode, a first uplink reference signal to the parent node; and
- transmit, for a full duplex mode, a second uplink reference signal to the parent node, wherein the grant indicating the first uplink beamforming direction is based at least in part on the first uplink reference signal and the second uplink reference signal.

52. The apparatus of claim 51, wherein the instructions are further executable by the processor to cause the apparatus to:
- transmit a signal to the parent node identifying the first uplink reference signal for the non-full duplex mode and the second uplink reference signal for the full duplex mode.

53. The apparatus of claim 51, wherein the instructions to transmit the uplink reference signal further are executable by the processor to cause the apparatus to:
- transmit the first uplink reference signal within a first resource associated with the non-full duplex mode; and
- transmit the second uplink reference signal within a second resource associated with the full duplex mode.

54. The apparatus of claim 51, wherein the instructions are further executable by the processor to cause the apparatus to:
- determine, based at least in part on the grant, a non-full duplex mode uplink beamforming direction for non-full duplex transmissions to the parent node; and
- determine, based at least in part on the grant, a full duplex uplink beamforming direction for a full duplex mode for full duplex communications between the parent node and the relay node, for full duplex communications between the relay node and the child node, or a combination thereof.

55. The apparatus of claim 46, wherein the relay node comprises a relay node within an integrated access and backhaul (IAB) network.

56. An apparatus for wireless communications at a parent node, comprising:
- a processor,
- memory coupled with the processor; and
- instructions stored in the memory and executable by the processor to cause the apparatus to:
  - receive a report from a relay node indicating a set of channel statuses and a respective downlink beamforming direction of a plurality of downlink beamforming directions between the parent node and the relay node that corresponds to a respective channel status in the set the channel statuses, the set of channel statuses determined for the plurality of downlink beamforming directions between the parent node and the relay node based at least in part on a downlink beamforming direction between the relay node and a child node;
  - transmit a grant to the relay node indicating a first downlink beamforming direction from the plurality of downlink beamforming directions based at least in part on the report; and
  - transmit a downlink transmission to the relay node based at least in part on the grant and the first downlink beamforming direction.

57. The apparatus of claim 56, wherein the instructions to transmit the grant further are executable by the processor to cause the apparatus to:
- transmit the grant indicating a resource allocation for simultaneous transmission and reception by the relay node when operating in a full duplex mode.

58. The apparatus of claim 57, wherein the instructions are further executable by the processor to cause the apparatus to:
- transmit the downlink transmission from the parent node within the resource allocation.

59. The apparatus of claim 57, wherein the instructions are further executable by the processor to cause the apparatus to:
- select the first downlink beamforming direction from the plurality of downlink beamforming directions for the resource allocation based at least in part on the report.

60. The apparatus of claim 56, wherein the instructions to transmit the grant are executable by the processor to cause the apparatus to:
- transmit the grant to identify, for a non-full duplex mode, a second downlink beamforming direction for non-full duplex transmissions from the parent node; and
- transmit the grant to identify, for a full duplex mode, the first downlink beamforming direction for the full duplex mode for full duplex communications between the parent node and the relay node, for full duplex communications between the relay node and the child node, or a combination thereof.

61. The apparatus of claim 56, wherein the child node comprises a user equipment (UE) or a second relay node.

62. The apparatus of claim 56, wherein the parent node comprises a parent relay node within an integrated access and backhaul (IAB) network.

63. An apparatus for wireless communications at a parent node, comprising:
- a processor,
- memory coupled with the processor; and
- instructions stored in the memory and executable by the processor to cause the apparatus to:
  - receive an uplink reference signal from a relay node transmitted using a subset of a plurality of uplink beamforming directions;
  - transmit a grant to the relay node indicating a first uplink beamforming direction from the plurality of uplink beamforming directions based at least in part on the uplink reference signal; and
  - monitor for an uplink transmission from the relay node based at least in part on the grant and the first uplink beamforming direction.

64. The apparatus of claim 63, wherein the instructions to transmit the grant are executable by the processor to cause the apparatus to:
- transmit the grant indicating a resource allocation for simultaneous transmission and reception by the relay node when operating in a full duplex mode.

65. The apparatus of claim 64, wherein the instructions are further executable by the processor to cause the apparatus to:
- receive the uplink transmission from the relay node within the resource allocation.

66. The apparatus of claim 64, wherein the instructions are further executable by the processor to cause the apparatus to:
- select the first uplink beamforming direction from the plurality of uplink beamforming directions for the resource allocation based at least in part on the uplink reference signal.

67. The apparatus of claim 63, wherein the instructions to receive the uplink reference signal are executable by the processor to cause the apparatus to:
- receive, for a non-full duplex mode, a first uplink reference signal from the relay node; and
- receive, for a full duplex mode, a second uplink reference signal from the relay node, wherein the grant indicating the first uplink beamforming direction is based at least in part on the first uplink reference signal and the second uplink reference signal.

68. The apparatus of claim 67, wherein the instructions are further executable by the processor to cause the apparatus to:
- receive a signal from the relay node identifying the first uplink reference signal for the non-full duplex mode and the second uplink reference signal for the full duplex mode.

69. The apparatus of claim 67, wherein the instructions are further executable by the processor to cause the apparatus to:
- receive the first uplink reference signal via a first resource associated with the non-full duplex mode; and
- receive the second uplink reference signal via a second resource associated with the full duplex mode.

70. The apparatus of claim 63, wherein the parent node comprises a parent node within an integrated access and backhaul (IAB) network.

* * * * *